(12) United States Patent
Ichapurapu et al.

(10) Patent No.: US 11,122,519 B1
(45) Date of Patent: Sep. 14, 2021

(54) NETWORK COMMUNICATIONS FOR DEVICE WITH CO-LOCATED RADIO TRANSMITTERS AND RECEIVERS

(71) Applicant: Amazon Technologies, Inc., Seattle, WA (US)

(72) Inventors: Ravi Ichapurapu, Morgan Hill, CA (US); Morris Yuanhsiang Hsu, Mountainview, CA (US); Sameet Ramakrishnan, Saratoga, CA (US); Duck Ho Bae, Campbell, CA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 16/216,445

(22) Filed: Dec. 11, 2018

(51) Int. Cl.
*H04W 52/20* (2009.01)
*H04W 52/24* (2009.01)
*H04W 4/80* (2018.01)
*H04W 72/04* (2009.01)
*H04W 88/12* (2009.01)
*H04W 84/12* (2009.01)

(52) U.S. Cl.
CPC ............ *H04W 52/20* (2013.01); *H04W 4/80* (2018.02); *H04W 52/243* (2013.01); *H04W 72/0473* (2013.01); *H04W 88/12* (2013.01); *H04W 84/12* (2013.01)

(58) Field of Classification Search
CPC ..... H04W 52/20; H04W 4/80; H04W 52/243; H04W 72/0473; H04W 88/12; H04W 84/12
USPC ........................................................ 370/329
See application file for complete search history.

(56) References Cited

U.S. PATENT DOCUMENTS

| 9,641,205 | B1* | 5/2017 | Hyun | H04B 1/406 |
| 2014/0073257 | A1* | 3/2014 | Tujkovic | H04B 1/123 |
| | | | | 455/63.1 |
| 2014/0221029 | A1* | 8/2014 | Chen | H04W 28/18 |
| | | | | 455/501 |

OTHER PUBLICATIONS

Sunil Jacob and Priyanka Ravi, "Enabling Coexistence of ZigBee and WiFi", Communications on Applied Electronics (CAE)—ISSN : 2394-4714, vol. 2—No. 6, Aug. 2015—www.caeaccess.org, (Year: 2015).*

* cited by examiner

*Primary Examiner* — Yemane Mesfin
*Assistant Examiner* — Intekhaab A Siddiquee
(74) *Attorney, Agent, or Firm* — Kilpatrick Townsend & Stockton LLP

(57) ABSTRACT

An electronic device includes a first communication controller and a second communication controller. The first and second communication controller are configured to communicate wirelessly using respective antennas. The electronic device includes a processor that is configured to execute instructions for determining that the first controller is transmitting a first radio frequency signal, and setting a transmit power of the first controller to a first transmit power value. The processor is configured to execute instructions for determining a duty cycle of the first controller is greater than a packet loss threshold associated with the second controller, and setting the transmit power of the first controller to a second transmit power value. The second transmit power value is less than the first transmit power value.

20 Claims, 11 Drawing Sheets

NETWORK COMMUNICATIONS FOR DEVICE WITH CO-LOCATED RADIO TRANSMITTERS AND RECEIVERS

BACKGROUND

The present invention relates generally to the field of electronic devices and, more particularly, to approaches for configuring radio transmitters co-located within the same electronic device. An increasing number of devices are configured to connect to networks in order to exchange information. In many cases, a single device may include a number of different communication controllers and corresponding transceivers to enable simultaneous communications using a number of different protocols. For example, a typical device may include communication controllers enabling simultaneous communication using BLUETOOTH, ZIGBEE, and wireless fidelity (WIFI) or wireless local area network (WLAN) (e.g., 802.11) communication protocols.

For a particular protocol, the bandwidth for the protocol is subdivided into a number of channels. Each channel can be separately used in transmitting and receiving data. The bandwidths allocated to particular communication protocols may overlap with one another. WLAN, BLUETOOTH and ZIGBEE protocols, for example, are allocated bandwidth in a frequency range of 2.40 gigahertz (GHz) to 2.48 GHz. Consequently, a particular channel used when communicating by one communication protocol may include or overlap with frequencies contained within a channel of another communication protocol. If multiple transmissions occur on overlapping channels at the same time, the transmissions may interfere with one another.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
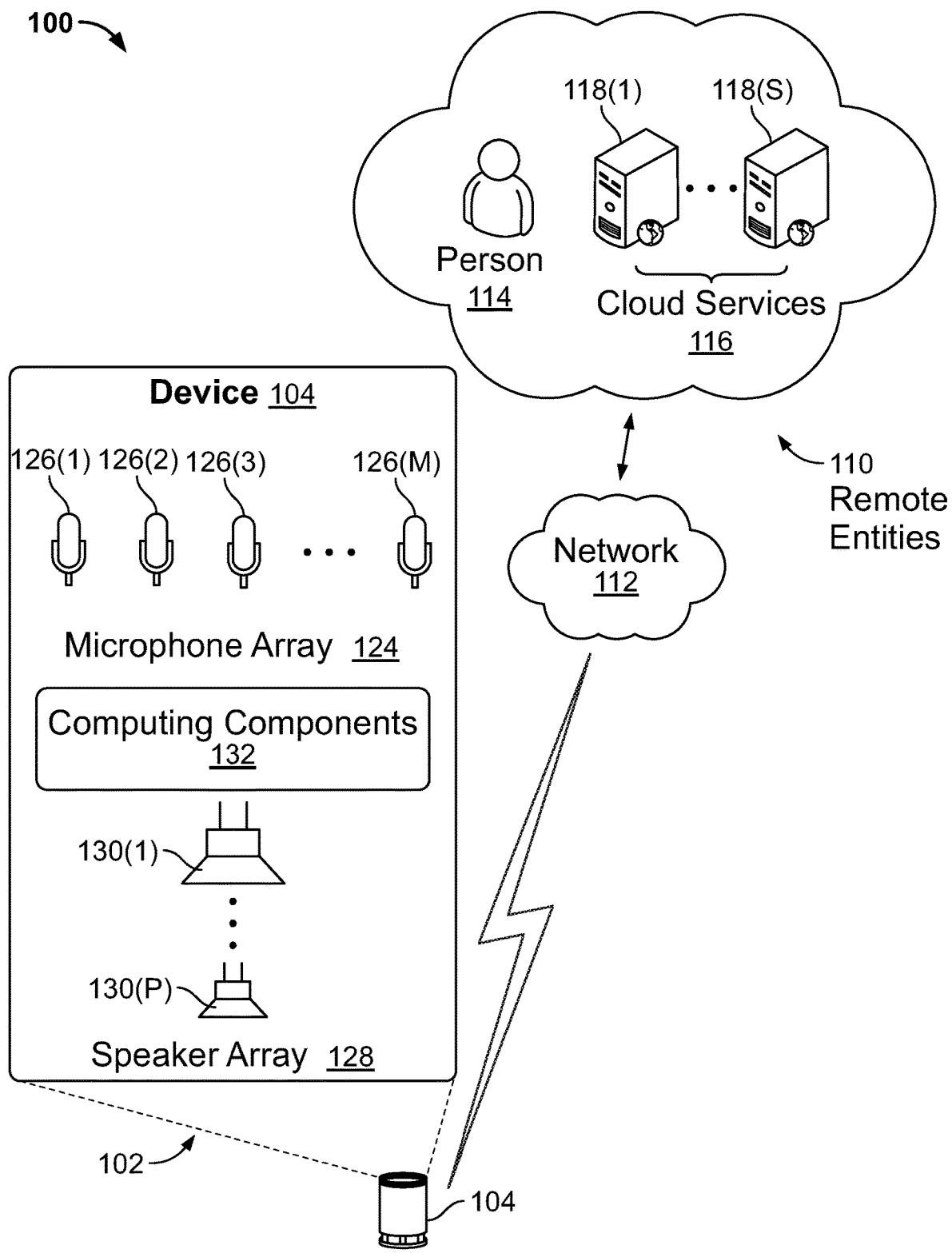
FIG. 1 depicts an exemplary environment including a device incorporating a communication subsystem configured in accordance with the present disclosure.

In many instances, an electronic device may utilize a number of different wireless communications protocols to transmit and receive data. For example, a network-connected speaker or smart phone device may simultaneously communicate using WLAN, BLUETOOTH, and ZIGBEE communication protocols. Typically, each communication protocol is allocated a particular bandwidth (i.e., a range of frequencies) for wireless transmissions and reception. The bandwidth available for each protocol is allocated according to international standards. For a particular protocol, the allocated bandwidth is subdivided into a number of channels. Each channel can be separately used in transmitting and receiving data.

Because radio frequency (RF) spectrum is limited, the bandwidths allocated to particular communication technologies may overlap with one another. WLAN, BLUETOOTH and ZIGBEE protocols, for example, are each allocated bandwidth in a frequency range of 2.40 gigahertz (GHz) to 2.48 GHz. Consequently, a particular channel used in accordance with one communication protocol may include frequencies contained within a channel allocated to another communication protocol. If a wireless interface broadcasts a message using a first communication technology (e.g., WLAN) using a channel that overlaps with a channel used by a second communication technology (e.g., ZIGBEE) to broadcast or receive a message at the same time, the two broadcasts may interfere with each other, potentially resulting in a failed data transmission or other errors. Even though the channels associated with different protocols may themselves exhibit different bandwidths (i.e., WLAN channels typically include a greater bandwidth than BLUETOOTH channels), two channels may be said to overlap one another if they each include at least some of the same frequencies.

In the present disclosure, an electronic device is configured to implement combinations of hardware-based and software-based solutions for mitigating potential interference between wireless communications employing different communication protocols. Before implementing a particular solution or combination of solutions, the device evaluates its current operational conditions and uses those conditions to determine the set of interference solutions to implement. Particular operating conditions of the electronic device may include relatively static, non-changing conditions, or infrequently changing conditions, such as the device's hardware configuration (e.g., the presence or absence of particular programmable filters, processing capacity of the device, and the like) or the configuration of a communications controller through which the device is communicating. The operating conditions may also include non-static or changing conditions, such as whether particular network interfaces are configured and connected to a network, the network activity of the device (e.g., whether the device is streaming content or undergoing active BLUETOOTH or ZIGBEE communications), the configuration of the device's radio or communication controllers (e.g., which communications channels the radio controllers are utilizing as well as the duty cycle of transmissions occurring on those communication channels), and the like.

Upon determining the operational conditions of the electronic device, the device determines the set of hardware and software-based interference-reducing solutions to implement. In some cases, the operational conditions may indicate that no solutions are required. If for example, only a single radio controller of the electronic device is active (e.g., only the device's WLAN radio controller is configured and the device's other radio controllers have no active connections), the likelihood of interference may be sufficiently low that no solutions may be implemented.

If, however, multiple radio controllers of the electronic device are configured, connected to a network, and actively transmitting and receiving wireless communications, that may indicate a potential for interference between the wireless communications of each radio controller. In that case, the device may determine the availability of hardware-based solutions for mitigating potential interference. Then, depending upon the device's operational conditions and available hardware solutions, one or more of those hardware-based solutions may be configured to provide interference mitigation. For example, the device may be configured to implement active interference cancellation (AIC). AIC is an interference mitigation approach that involves the device injecting a signal into a first one of the device's wireless communication paths. The injected signal is specifically configured to destructively interfere with interference signals that may have coupled to the first wireless communication path from another one of the device's wireless communication paths. For example, if a device includes both a WLAN radio controller and corresponding communication path and a ZIGBEE radio controller and corresponding communication path, signals transmitted by the WLAN radio controller may couple to the communication path connected to the ZIGBEE controller. Those coupled signals, if at similar frequencies to those of the ZIGBEE communications, can interfere with the ZIGBEE communications. In that case, the implementation of AIC would involve the electronic device causing signals to be injected into the ZIGBEE communication path that destructively interfere with the interference signals coupled from the WLAN communication path.

Although AIC is an effective mechanism for interference mitigation, the approach may require substantial processing power to implement the high-frequency signal analysis required to generate the destructive signal injected into the device's communication paths. Additionally, before AIC may be utilized, a calibration process, as described herein, is executed to determine appropriate values for the hardware components utilized to implement AIC. During the calibration process, wireless data communication may be suspended as calibration may require the transmission of one or more test signals. Due to this overhead, the electronic device may evaluate a number of criteria before electing to implement AIC.

For example, in a particular electronic device, if both the device's ZIGBEE and WLAN radio controllers are operational and utilizing communication channels that overlap one another, that may indicate a likelihood of interference between the ZIGBEE and WLAN communications. Typically, the severity of any such interference will vary with the duty cycle being utilized by the device's WLAN radio controller. The duty cycle is an indicator of the average power level of transmissions on a particular communication channel. Typically, the duty cycle is expressed as a percentage value indicating the fraction of a particular transmission period that the transmitter (e.g., the WLAN radio controller) is activity transmitting. As the duty cycle utilized by the WLAN radio controller increases, the severity of the interference also increases.

Accordingly, if the duty cycle being utilized by the WLAN radio controller is relatively low (i.e., the duty cycle falls below a particular threshold duty cycle), the severity of any such interference may be minimal. In that case, the cost of implementing AIC—both in terms of additional processing power and interruptions to communications due to the AIC calibration process, may not be worth a negligible reduction in interference between the WLAN communications and other device wireless communications (e.g., ZIGBEE or BLUETOOTH communications). In various embodiments, the electronic device may evaluate other criteria, such as the hardware or software configuration of the device as well as the device's operational conditions, as described herein, to evaluate whether to implement AIC-based interference mitigation.

Similarly, some electronic devices may include programmable filters on one or more of the device's wireless communication channels. Such programmable filters can be configured to reduce components of a signal passing through the programmable filter falling within a particular bandwidth. Components of the signal that fall outside that particular bandwidth will pass through the programmable filter without being altered. Typically, a programmable filter is positioned between each of the device's radio controllers and respective antennas. In that case, each programmable filter is configured to pass signals falling within the bandwidth currently utilized by the connected radio controller, while filtering-out signals falling outside that bandwidth and that represent interference generated by the device's other communication channels.

For example, if a device has both a WLAN and ZIGBEE radio controller, the programmable filter connected to the WLAN radio controller may be configured to filter signals having frequencies falling within the bandwidth allocated for ZIGBEE communications. Conversely, the programmable filter connected to the ZIGBEE radio controller may be configured to filter signals having frequencies falling within the bandwidth allocated for WLAN communications. In this manner, signals that may potentially interfere with wireless communications before those interfering signals reach the device's radio controllers.

Before implementing interference mitigation using such programmable filters, the electronic device may evaluate certain criteria to ensure that the use of the programmable filters in this manner will provide effective interference mitigation. For example, in a particular device having WLAN and ZIGBEE radio controllers, if each radio controller is configured to utilize a different set of frequencies, the use of the programmable filters may provide interference mitigation. But if each radio controller is configured to use the same set of frequencies for radio communications, the programmable filters may not provide interference mitigation. In that case, because both the intended wireless communications and the potentially interfering communications fall within the same bandwidth, attempts to filter out the interfering signals using the programmable filter could also filter the intended communications as well. In that case, although the programmable filters may reduce the strength of the interfering signals, they would also reduce the strength of the intended communications potentially reducing the strength of transmitted and received wireless communications.

Accordingly, before configuring the electronic device's programmable filters, if present, the device is configured to analyze the communications channels utilized by each of the device's radio controllers to both confirm that the programmable filters should be configured for interference mitigation and determine the specific ranges of signal frequencies that each of the device's programmable filters should filter.

In addition to hardware solutions, the electronic device may be configured to execute one or more software-based solutions to provide interference mitigation. Specifically, in an electronic device having both a WLAN radio controller and ZIGBEE radio controller, the device may be configured to set a maximum transmit power for WLAN-based communications that is selected to both enable satisfactory WLAN communications, while also reducing or minimizing an amount of interference generated at the device's ZIGBEE radio controller by the WLAN communications.

Furthermore, when WLAN transmissions couple to the antenna connected to the ZIGBEE radio controller, the coupled interference signals can boost the power level of the signal ultimately received by the ZIGBEE radio controller. This can, in turn, cause the received signal to clip (i.e., exceed a maximum signal power level that the ZIGBEE radio controller is configured to process) when the received signal is amplified by the ZIGBEE controller. Signal clipping refers to a signal distortion that results when the power level of a received signal exceeds a maximum threshold that the corresponding radio controller can process. This signal distortion may cause data to be lost and can make it difficult for the radio controller to successfully decode the received signal. To reduce the instances of signal clipping resulting from interference from WLAN transmissions, the electronic device may also implement a method to reduce the amplification applied by the device's ZIGBEE radio controller to received signals. This reduced amplification can reduce instances of signal clipping thereby increasing the likelihood that the ZIGBEE radio controller can decode received signals and can act to mitigate interference that may be generated by a collocated WLAN radio controller, for example.

In some embodiments, the device may be configured to only reduce the gain of the amplifier of the ZIBEE radio controller when a corresponding WLAN radio controller (or other radio controller) is actively transmitting radio signals and return the gain to normal operational levels when the radio controller is no longer transmitting. In that case, the electronic device may incorporate a hardware solution in which the device's ZIGBEE radio controller receives a signal input from the device's other radio controllers indicating when they are actively transmitting radio signals via their respective antennas. Based upon that input, the ZIGBEE radio controller can control a switch to disconnect the ZIGBEE radio controller's amplifier from the transmission line between the ZIBEE antenna and the ZIGBEE radio controller. This, in effect, reduces the amplification of any signals received at the device's ZIGBEE radio controller, reducing the likelihood of signal clipping. When the input signal indicates that the other device radio controllers are no longer transmitted, the ZIGBEE radio controller can again operate the switch to place the amplifier back into the transmission path from the ZIGBEE antenna to the ZIGBEE radio controller.

FIG. 1 shows an illustrative architecture 100, set in an exemplary environment 102 that includes a device 104 that can incorporate a communication subsystem configured in accordance with the present disclosure. Device 104 may be positioned in any number of locations (e.g., ceiling, wall, in a lamp, beneath a table, on a work desk, in a hall, under a chair, etc.) within the environment 102. Device 104 is configured to communicatively couple to a number of remote entities 110 over a network 112. The remote entities 110 may include individual people, or automated and remote computer systems (not shown) that can interact with device 104. In some embodiments, remote entities 110 may comprise cloud services 116 hosted, for example, on one or more servers 118(1) . . . 118(S). These servers 118(1)-(S) may be arranged in any number of ways, such as server farms, stacks, and the like that are commonly used in data centers.

The cloud services 116 generally refer to a network-accessible platform implemented as a computing infrastructure of processors, storage, software, data access, and so forth that is maintained and accessible via a network such as the Internet. Cloud services 116 do not require end-user knowledge of the physical location and configuration of the system that delivers the services. Common expressions associated with cloud services include "on-demand computing", "software as a service (SaaS)", "platform computing", "network accessible platform", and so forth.

The cloud services 116 may host any number of applications that can process input received from device 104, and produce a suitable response. Example applications might include web browsing, online shopping, banking, email, work tools, productivity, entertainment, educational, and so forth.

In an embodiment, device 104 is equipped with an array 124 of microphones 126(1) . . . 126(M) to receive the voice input from the user. The microphones 126(1)-(M) are generally arranged at a first or top end of device 104. Although multiple microphones are illustrated, in some implementations, device 104 may be embodied with only one microphone.

Device 104 may further include a speaker array 128 of speakers 130(1) . . . 130(P) to output sounds. Speakers 130(1)-(P) may be configured to emit sounds at various frequency ranges, so that each speaker has a different range. In this manner, device 104 may output high frequency signals, mid frequency signals, and low frequency signals.

Device 104 may further include computing components 132 that process inputs received by device 104 (e.g., via microphone array 124), enable communication with the remote entities 110 over the network 112, and generate audio to be output by speaker array 128. One collection of computing components 132 are illustrated and described with reference to FIG. 2.

Figure 2:
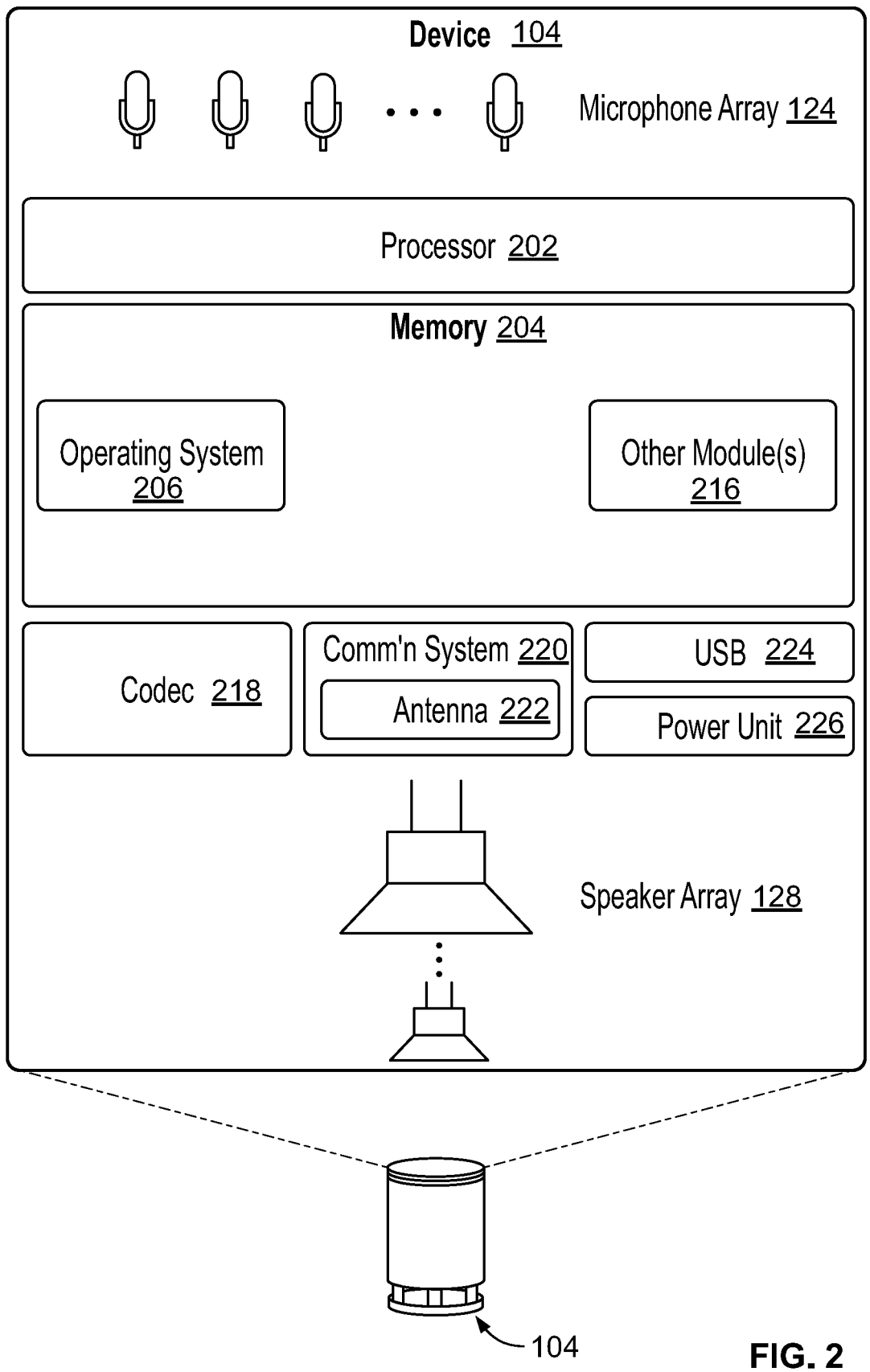
FIG. 2 illustrates example components of an example electronic device that can be used in accordance with various embodiments.

FIG. 2 shows selected functional components of device 104 in more detail. Generally, device 104 may be implemented as a standalone device that is relatively simple in terms of functional capabilities with limited input/output components, memory and processing capabilities. For instance, device 104 may not have a keyboard, keypad, or other form of mechanical input. Nor does device 104 necessarily require a display or touch screen to facilitate visual presentation and user touch input. Instead, device 104 may be implemented with a network interface (wireless or wire-based), power, limited processing/memory capabilities, and, in some cases, the ability to receive and output audio. In the illustrated implementation, device 104 includes an optional microphone array 124, speaker array 128, processor 202, and memory 204.

Memory 204 may include computer-readable storage media ("CRSM"), which may be any available physical media accessible by the processor 202 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by processor 202.

Several modules such as instructions, data stores, and so forth may be stored within the memory 204 and configured to execute on processor 202. An operating system module 206 is configured to manage hardware and services (e.g., wireless unit, USB, Codec) within and coupled to device 104 for the benefit of other modules. Several other modules may be provided to process input from the user. For instance, a speech recognition module, if provided, enables some level of speech recognition functionality. In that case, an acoustic echo cancellation module and a double talk reduction module can be provided to process the audio signals to substantially cancel acoustic echoes and substantially reduce double talk that may occur. These modules may work together to identify times where echoes are present, where double talk is likely, where background noise is present, and attempt to reduce these external factors to isolate and focus on the near talker. A query formation module may also be provided to receive parsed speech content output by the speech recognition module and to form a search query or some form of request. This query formation module may utilize natural language processing (NLP) tools as well as various language modules to enable accurate construction of queries based on the user's speech input.

In embodiments, device 104 might further include a codec 218 coupled to the microphones of the microphone array 124 and the speakers of the speaker array 128 to encode and/or decode the audio signals. The codec 218 may convert audio data between analog and digital formats.

Device 104 includes a wireless communication system 220 coupled to an antenna 222 (which may include one or more separate antenna components) to facilitate a wireless connection to a network or one or more other remote components configured to communication with device 104. Wireless communication system 220 may implement one or more of various wireless technologies, such as WLAN, BLUETOOTH, ZIGBEE, and so on.

USB port 224 may further be provided as part of device 104 to facilitate a wired connection to a network, or a plug-in network device that communicates with other wireless networks. In addition to USB port 224, or as an alternative thereto, other forms of wired connections may be employed, such as a broadband connection, and connected to device 104 using one or more additional modules 216 that may be utilized for data transfer. A power unit 226 is further provided to distribute power to the various components of device 104.

Figure 3:
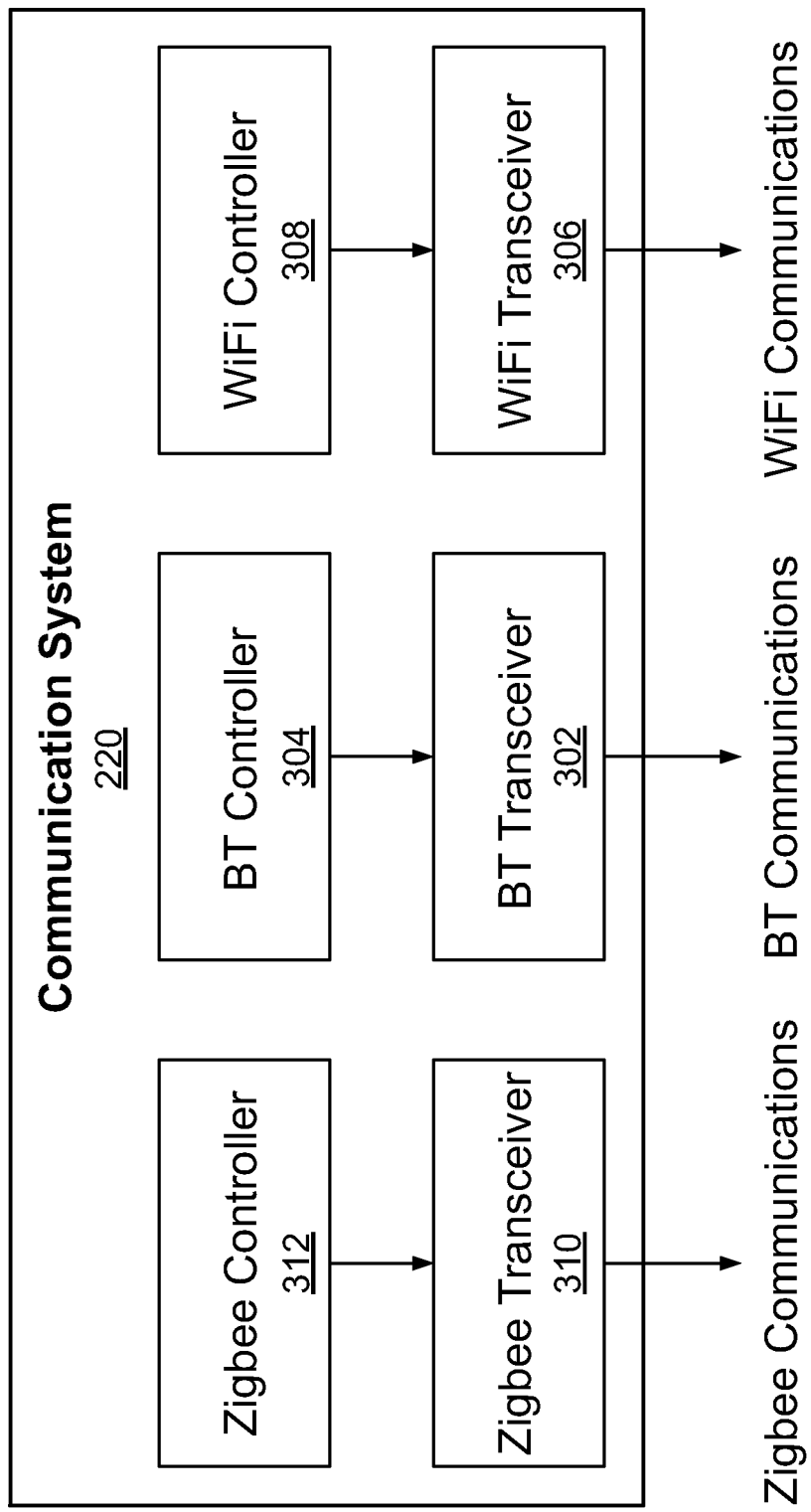
FIG. 3 is a block diagram depicting functional components of a communication system of an example device.

FIG. 3 is a block diagram depicting functional components of communication system 220 of an example device (e.g., device 104 of FIGS. 1 and 2). In this example, communication system 220 includes subsystems for transmitting, receiving, encoding and decoding BLUETOOTH, WLAN and ZIGBEE communications. Specifically, communication system 220 includes BLUETOOTH transceiver 302 that is configured to provide BLUETOOTH communication capability by transmitting BLUETOOTH packets using a suitable antenna (not shown) and receiving BLUETOOTH packets via the same antenna. BLUETOOTH controller 304 is coupled to the BLUETOOTH transceiver 302. BLUETOOTH controller 304 is configured to encode and decode BLUETOOTH communications that are either transmitted through BLUETOOTH transceiver 302 or received via BLUETOOTH transceiver 302. BLUETOOTH controller 304 is further configured to select an appropriate BLUETOOTH channel for the transmission or reception of a BLUETOOTH data packet and is configured to instruct BLUETOOTH transceiver 302 to utilize such BLUETOOTH channel when either transmitting or receiving packets. In some cases, as described herein, the selection of an appropriate channel for data transmission or reception may involve BLUETOOTH controller 304 executing one or more algorithms or routines to identify an appropriate channel.

During operation of the BLUETOOTH communication system, BLUETOOTH controller 304 may further monitor or control one or more attributes of data packets being transmitted or received via BLUETOOTH transceiver 302. For example, for data packets transmitted using a particular BLUETOOTH channel, BLUETOOTH controller 304 can set a duty cycle to be utilized when transmitting the data packet. Conversely, for data packets received by BLUETOOTH transceiver 302 in a particular channel, BLUETOOTH controller 304 can determine a received signal strength indicator (RSSI) for those communications. The RSSI is a measurement of the power of the received signal compared to background noise, which can be an indicator of how much interference is present on that particular channel.

Communication system 220 includes WLAN transceiver 306 that is configured to provide WLAN communication capability by transmitting WLAN packets using a suitable antenna (not shown) and receiving WLAN packets using the same antenna. WLAN controller 308 is coupled to the WLAN transceiver 306. WLAN controller 308 is configured to encode and decode WLAN communications that are either transmitted through WLAN transceiver 306 or received using WLAN transceiver 306. WLAN controller 308 is further configured to select an appropriate WLAN channel for the transmission or reception of WLAN data packets and is configured to instruct WLAN transceiver 306 to utilize such WLAN channel when either transmitting or receiving packets. In some cases, as described herein, the selection of an appropriate channel for data transmission or reception may involve WLAN controller 308 executing one or more algorithms or routines to identify an appropriate channel.

During operation of the WLAN communication system, WLAN controller 308 may further monitor or control one or more attributes of data packets being transmitted or received via WLAN transceiver 306. For example, for data packets transmitted using a particular WLAN channel, WLAN controller 308 can set a duty cycle to be utilized when transmitted the data packet. Conversely, for data packets received by WLAN transceiver 306 in a particular channel, WLAN controller 308 can determine an RSSI for those communications, which can be an indicator of how much interference or noise is present on that particular channel.

Communication system 220 includes ZIGBEE transceiver 310 that is configured to provide ZIGBEE communications by transmitting ZIGBEE packets using a suitable antenna (not shown) and receiving ZIGBEE packets via the same antenna. ZIGBEE controller 312 is coupled to the ZIGBEE transceiver 310. ZIGBEE controller 312 is configured to encode and decode ZIGBEE communications that are either transmitted through ZIGBEE transceiver 310 or received via ZIGBEE transceiver 310. ZIGBEE controller 312 is further configured to select an appropriate ZIGBEE channel for the transmission or reception of a ZIGBEE data packet and is configured to instruct ZIGBEE transceiver 310 to utilize such ZIGBEE channel when either transmitting or receiving packets. In some cases, as described herein, the selection of an appropriate channel for data transmission or reception may involve ZIGBEE controller 312 executing one or more algorithms or routines to identify an appropriate channel.

During operation of the ZIGBEE communication system, ZIGBEE controller 312 may further monitor or control one or more attributes of data packets being transmitted or received via ZIGBEE transceiver 310. For example, for data packets transmitted using a particular ZIGBEE channel, ZIGBEE controller 312 can set a duty cycle to be utilized when transmitted the data packet. Conversely, for data packets received by ZIGBEE transceiver 310 in a particular channel, ZIGBEE controller 312 can determine an RSSI for those communications, which can be an indicator of how much interference or noise is present on that particular channel.

Each of the communication protocols implemented by communication system 220 involves transmitting or receiving radio signals (e.g., RF signals) that are constrained to particular ranges of frequencies (i.e., bandwidths) referred to as channels. The channels for each protocol are designated within a larger bandwidth or range of frequencies allocated to the communication protocol. In some cases, the bandwidths allocated to each of the BLUETOOTH, WLAN, and ZIGBEE protocols at least partially overlap (that is, they each include some of the same frequencies). And, accordingly, different channels used by each protocol may also overlap one another.

Figure 4:
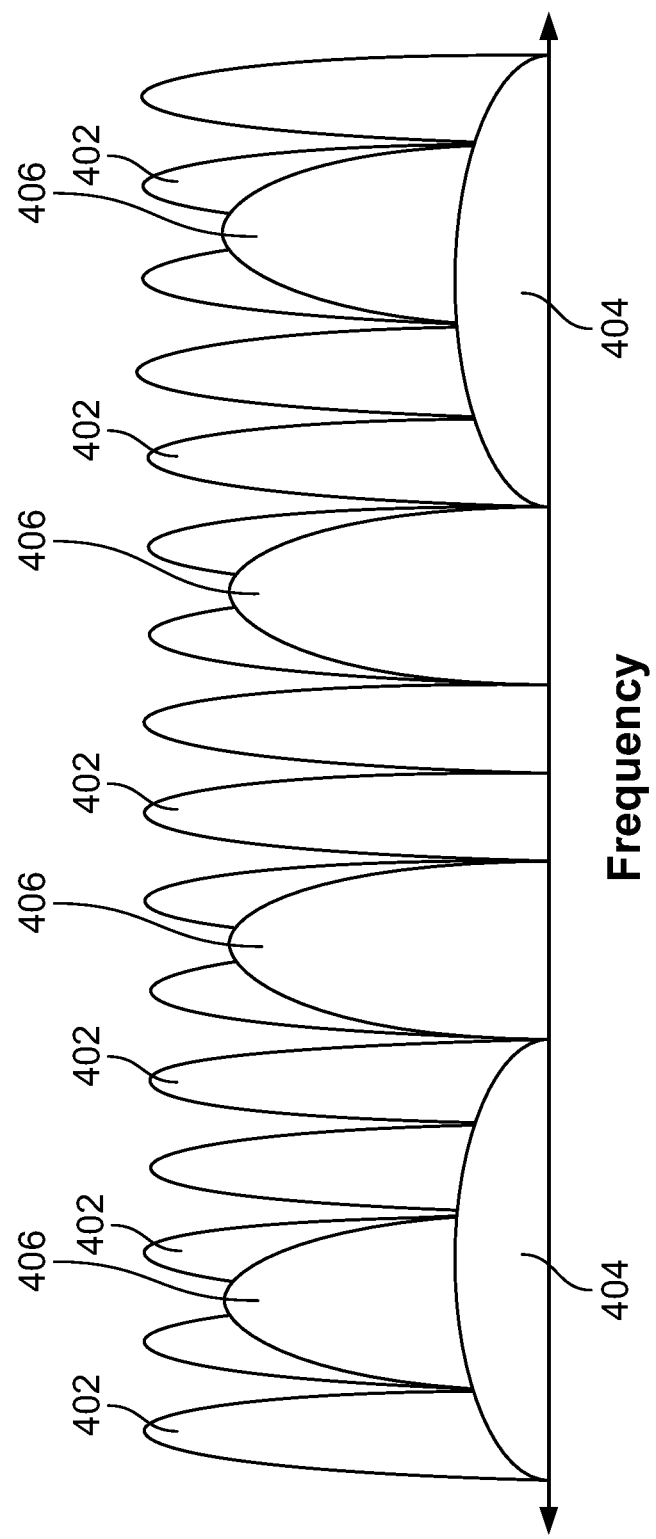
FIG. 4 is a diagram depicting overlapping communications channels used by a number of different communication protocols.

FIG. 4 is a diagram depicting overlapping communications channels used by a number of different communication protocols. Specifically, when transceivers 302, 306, and 310 of FIG. 3 are implemented as respective BLUETOOTH, WLAN, and ZIGBEE devices, the transmitted and received radio communications may share one or more of the industrial, scientific and medical (ISM) frequency bands, such as the 2.400-2.500 GHz frequency band, among others. As shown in FIG. 4, BLUETOOTH transceiver 302 may transmit and receive BLUETOOTH packets using a first set of communications channels 402, such as a set of 1 MHz Bluetooth channels. Similarly, WLAN transceiver 306 may transmit and receive WLAN packets using another set of communication channels 404, such as a set of wireless local area network (WLAN) or WLAN channels. Similarly, ZIGBEE transceiver 310 may transmit and receive ZIGBEE packets using another set of communication channels 406, such as a set of 2 MHz ZIGBEE channels. The channels allocated to each protocol can have different bandwidths and so may only partially overlap one another. To identify the channels, the channels allocated for each communication protocol are allocated channel numbers.

As is depicted in FIG. 4, the various sets of channels use portions of the shared ISM frequency band. For example, a 22 MHz WLAN channel may have a center frequency of 2.412 GHz, which may overlap, at least partially, 20 different 1 MHz BLUETOOTH channels. This potentially causes problems for both reception and transmission of WLAN and BLUETOOTH packets occurring on overlapping channels. Similarly, overlapping WLAN and ZIGBEE channels can potentially interfere with one another if data is broadcast and/or received in the overlapping channels at the same time.

Figure 5:
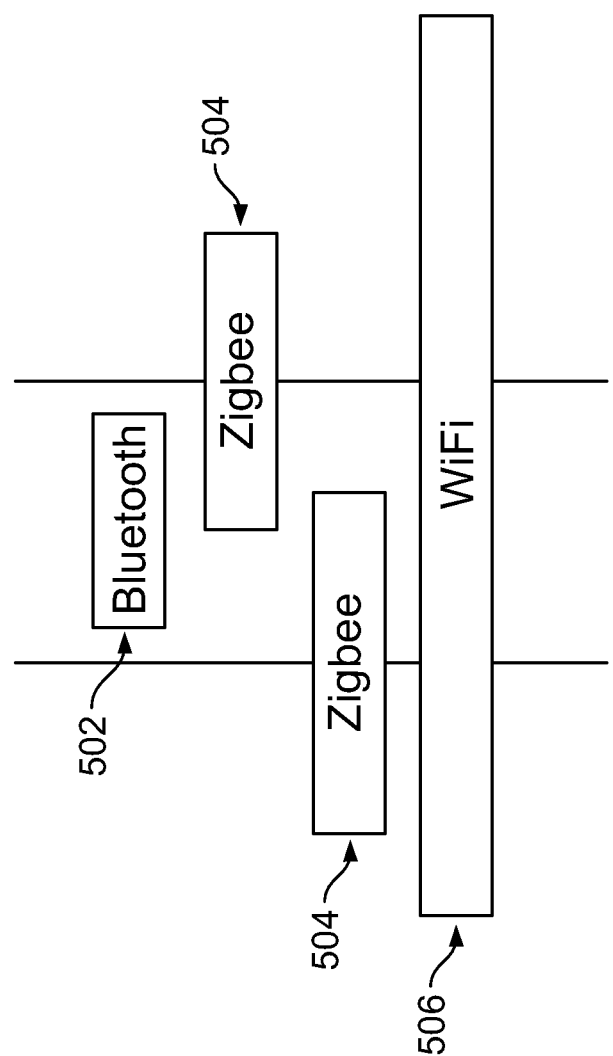
FIG. 5 is a diagram depicting data packet transmissions occurring on overlapping communications channels in the time domain.

To illustrate, FIG. 5 is a diagram depicting data packet transmissions occurring on overlapping communications channels in the time domain. As depicted, BLUETOOTH transceiver 302, WLAN transceiver 306 and ZIGBEE transceiver 310 may communicate BLUETOOTH packet 502, ZIGBEE packets 504, and WLAN packet 506 at approximately the same time using overlapping communications channels, thereby potentially creating interference for BLUETOOTH transceiver 302, WLAN transceiver 306 and ZIGBEE transceiver 310.

The present electronic device is configured to implement combinations of hardware-based and software-based solutions for mitigating interference between wireless communications employing different communication protocols. Before implementing a particular solution or combination of solutions, the device evaluates its current operational conditions and uses those conditions to determine the set of interference mitigation solutions to implement. Upon determining the operational conditions of the electronic device, the device determines the set of hardware and software-based interference-reducing solutions to implement. In some cases, the operational conditions may indicate that no solutions are required. If for example, only a single radio controller of the electronic device is active (e.g., only the device's WLAN radio controller is configured and the device's other radio controllers have no active connections), the likelihood of interference may be sufficiently low that no solutions may be implemented.

Figure 6:
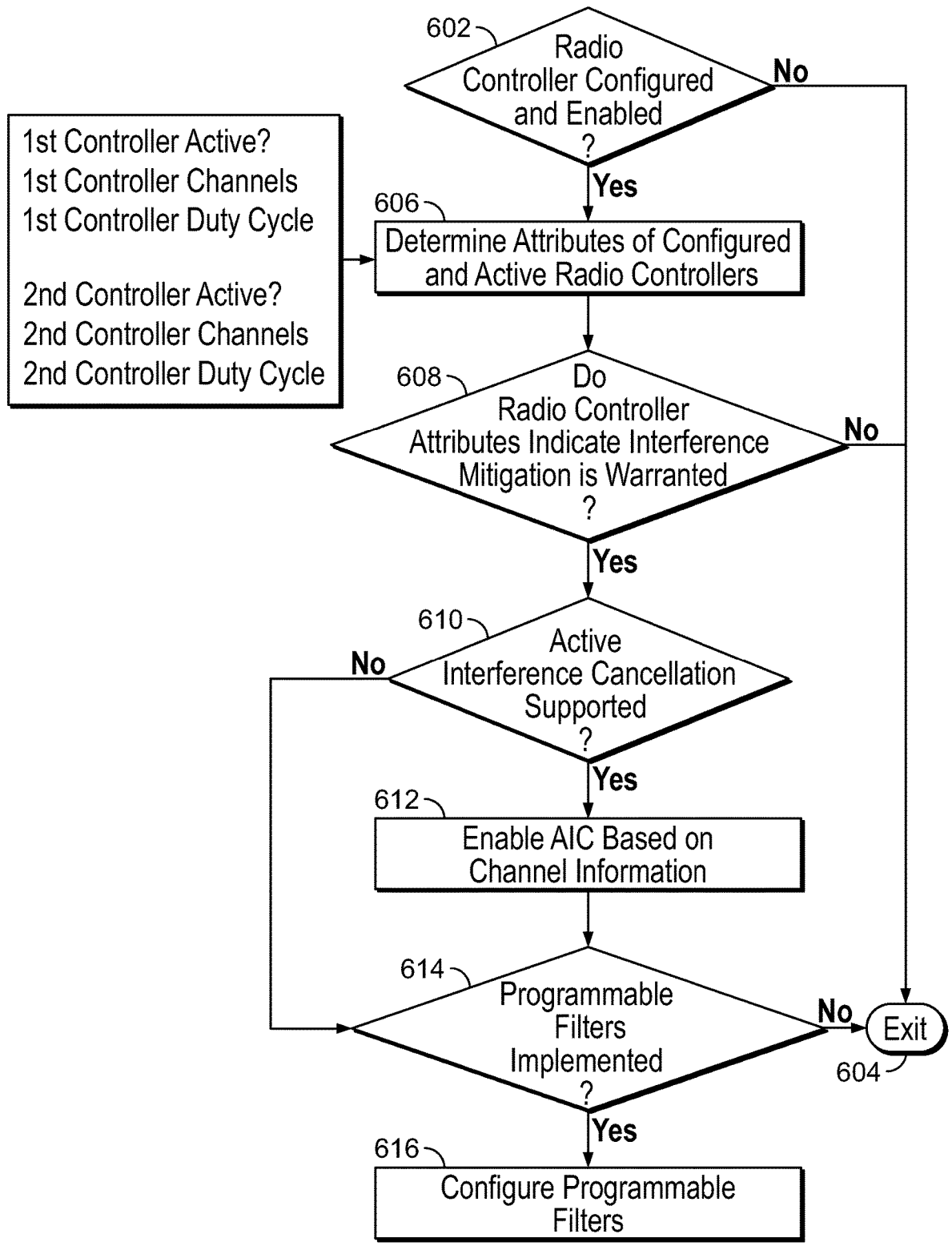
FIG. 6 is a flowchart depicting a method for a controller of an electronic device to determine operational conditions of the electronic device and, based on those operational conditions, implement one or more hardware-based system for interference mitigation.

FIG. 6 is a flowchart depicting a method for a controller of an electronic device (e.g., processor 202 of device 104 operating in combination with a controller of the device's communication system 220) to determine operational conditions of the electronic device and, based on those operational conditions, implement one or more hardware-based system for mitigating interference between wireless communication channels. The method of FIG. 6 is described in terms of a device having both a WLAN radio controller and ZIGBEE radio controller and connected antennas. In such a configuration, the approach depicted in FIG. 6 may be utilized to mitigate the degree to which the transmission and reception of WLAN communications by the WLAN radio controller interferes with the ZIGBEE radio controller's receipt of ZIGBEE-encoded wireless communications. Although the method of FIG. 6 is described in terms of specific communication protocols and the hardware components and circuitry associated with those protocols, it should be understood that the method of FIG. 6 may be employed to mitigate interference that may result from the operations of two or more radio controllers implementing any combination of communication protocols. Specifically, the method of FIG. 6 is described generally in terms of interference mitigation in an electronic device having WLAN and ZIGBEE radio controllers, though it should be understood that the method may be implemented by a device having any combination of radio controllers implementing the same or different combinations of wireless communication protocols.

In step 602 the controller determines whether a first radio controller (e.g., a ZIGBEE radio controller) is enabled. For example, processor 202 may communicate with communication system 220 of device 104 to determine whether the ZIGBEE radio controller (e.g., ZIGBEE controller 312) is enabled and connected to or attempting to connect to a network or device for wireless communications.

If the outcome of step 602 is a determination that the ZIGBEE radio controller is not enabled, there is little likelihood of potential interference between the ZIGBEE radio controller and other radio controllers in the device and so the method can move to step 604 and exit.

But if in step 602 it is determined that the ZIGBEE radio controller is enabled, there is a possibility for interference between the communications of the ZIGBEE radio controller and the communications of another radio controller (e.g., a WLAN radio controller) in the device. Accordingly, the method proceeds to step 606 in which the processor determines attributes of the radio controllers within the device. In a typical implementation, the processor accesses a framework level of the device's network controller to determine, for each radio controller within the device, whether the radio controller is active (e.g., whether the controller is connected to another network or device or whether the radio controller is attempting to connect to a network or other device), a listing of any channels that have been allocated to the radio controller, and a duty cycle that the radio controller is using in transmitting its radio communications.

Having determined attributes of the device's radio controllers in step 606, in step 608 the processor analyzes those attributes to determine whether interference mitigation is warranted. The determination may be made based upon an analysis of any of the attributes gathered in step 606.

If, for example, the ZIGBEE radio controller is not active, the processor may determine that interference mitigation is not warranted and the method may exit at step 604. Similarly, if the ZIGBEE radio controller is active, but its duty cycle falls below a predetermined duty cycle threshold (indicating that the ZIGBEE controller is transmitting wireless communications at a relatively low power level), that may indicate that the ZIGBEE controller is not experiencing significant interference and the method may exit at step 604. Conversely, if both the ZIGBEE radio controller and the WLAN radio controller are active and have both been allocated communication channels that overlap one another, that may indicate that there is a high likelihood that the WLAN radio controller's transmissions may interfere with the ZIGBEE radio controller transmission and/or reception of ZIGBEE wireless communications and the method may proceed to step 610 to begin implementing interference mitigation. In general, the processor may evaluate a number of different criteria using the radio controller attributes identified in step 606 to determine whether to implement interference mitigation. In an embodiment, for example, Table 1, below, identifies a number of different criteria that, if any are true, indicate that the processor should implement interference mitigation.

TABLE 1

Criteria Indicating Interference Mitigation Is To Be Implemented

ZIGBEE radio controller is active with duty cycle exceeding predetermined threshold (e.g., 60%)
ZIGBEE radio controller is active and WLAN radio controller has duty cycle exceeding predetermined threshold (e.g., 30%)
The ZIGBEE radio controller and the WLAN radio controller are both active and a channel allocated to the ZIGBEE radio controller overlaps a channel allocated to the WLAN radio controller In step 610, the processor determines whether the electronic device is configured to implement AIC. In an embodiment, a value indicating whether the device is configured to implement AIC may be encoded within a memory (e.g., a non-volatile read-only memory ("ROM") or electrically erasable programmable read-only memory ("EEPROM")) of communication system 220 of device 104. Such an indicator or flag may be established at the time of manufacture of the electronic device and, specifically, communication system 220, and can indicate a status of the hardware of communication system 220 and an indication of specific features, such as AIC, supported by communication system 220. Accordingly, to determine whether AIC is supported, the processor may be configured to access a memory of communication system 220 to determine whether a flag indicating support of AIC is present. If AIC is not supported, the method proceeds to step 614. If AIC is supported, in step 612 AIC is implemented.

As discussed above, AIC is an approach to minimize interference that involves injecting a signal into a first one of the device's wireless communication paths. The injected signal is specifically configured to destructively interfere with interference signals that may have coupled to the first of the device's wireless communication paths from another one of the device's wireless communication paths. For example, if a device includes both a WLAN radio controller and corresponding communication path and a ZIGBEE radio controller and corresponding communication path, signals transmitted by the WLAN radio controller may couple to the communication path connected to the ZIGBEE controller. Those coupled signals, if at similar frequencies to those of the ZIGBEE communications, can interfere with the ZIGBEE communications. In that case, the implementation of AIC would involve the electronic device causing signals to be injected into the ZIGBEE communication path that destructively interfere with the signals coupled from the WLAN communication path.

Figure 7:
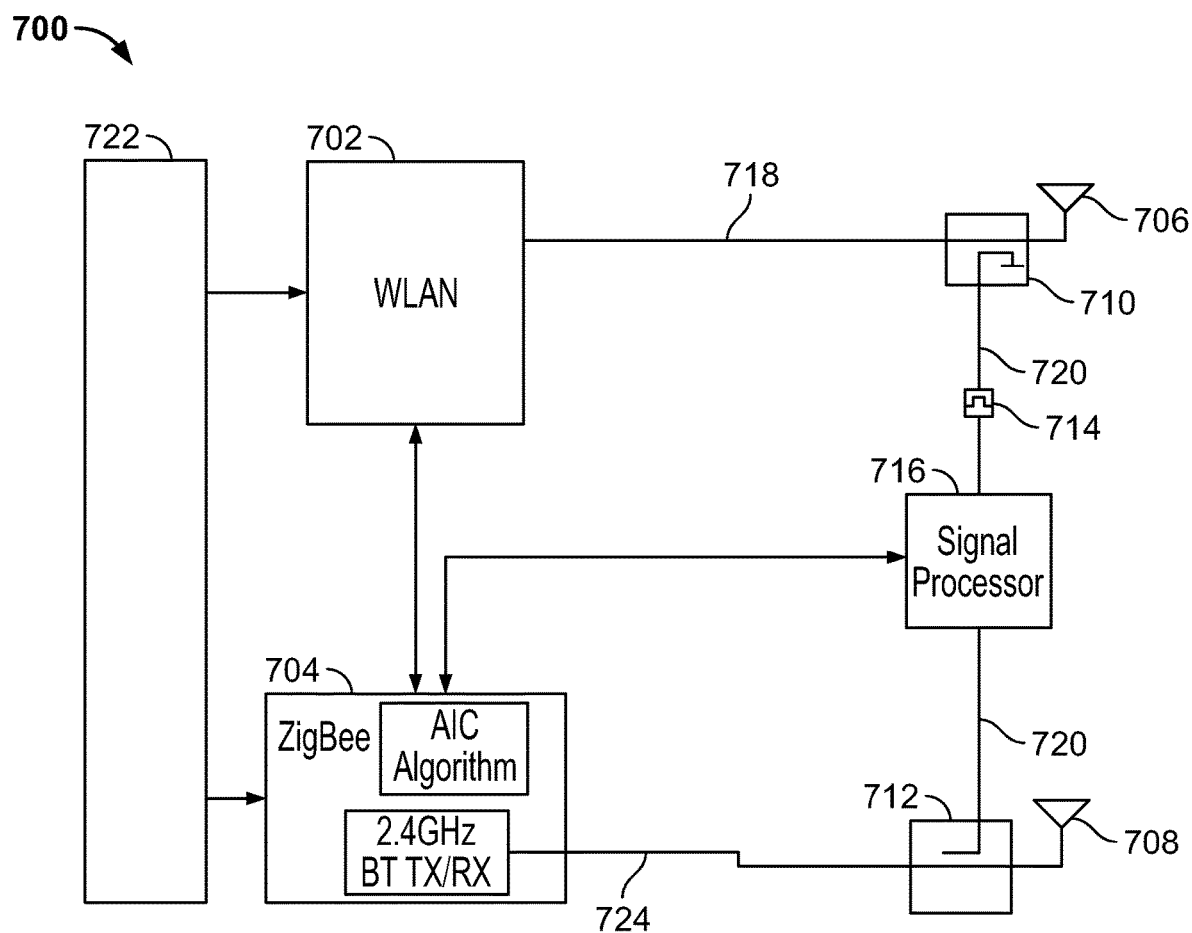
FIG. 7 is a block diagram depicting a communication system that is configured to use active interference cancellation (AIC) to minimize the degree to which signals transmitted by a first radio controller interfere with signals transmitted or received by a second radio controller.

FIG. 7 is a block diagram depicting a communication system that includes a WLAN radio controller and a ZIGBEE controller that is configured to use AIC to minimize the degree to which signals transmitted by the WLAN radio controller interfere with signals transmitted or received by the ZIGBEE radio controller.

Communication system 700 includes WLAN radio controller 702 and ZIGBEE radio controller 704. WLAN radio controller 702 is connected to antenna 706 and ZIGBEE radio controller 704 is connected to antenna 708. Communication system 700 includes a first RF coupler 710 and a second RF coupler 712. RF coupler 710 is coupled to the transmission line 718 between WLAN controller 702 and antenna 706. RF coupler 710 is also connected to programmable delay 714. Programmable delay 714 is, in turn, connected to signal processor 716. Signal processor 716 is configured to modify a magnitude of a signal passing through signal processor 716 (e.g., via an adjustable attenuator) as well as a phase of the signal passing through signal processor 716 (e.g., via an adjustable phase shifter).

Signal processor 716 is, in turn, connected to RF coupler 712. RF coupler 712 is connected to transmission line 724 between ZIGBEE radio controller 704 and antenna 708.

When an RF signal is transmitted by WLAN radio controller 702 on transmission line 718, RF coupler 710 creates a copy of the transmitted signal on a first cancellation path 720. Cancellation path 720 is an electrical path with one or more components including programmable delay 714 and signal processor 716 used to adjust a delay, phase, amplitude, or any combination thereof of a copy of an RF signal transmitted by WLAN radio controller 702.

On cancellation path 720, programmable delay 714 is coupled to RF coupler 710 and signal processor 716 is connected to programmable delay 714. Programmable delay 714 can be controlled by processor 722 (e.g., processor 202 of device 104 or a controller within communication system 220) to select a delay for cancellation path 720. Processor 722 generally controls programmable delay 714 to match a delay of cancellation path 720 to a propagation delay in transmission line 718 between WLAN radio controller 702 and antenna 706.

Signal processor 716 is controlled by processor 722 to adjust a phase, an amplitude or both of the RF signal received from RF coupler 710. The modified RF signal is transmitted from signal processor 716 to RF coupler 712. RF coupler 712, in turn, injects the signal received from signal processor 716 into transmission line 724.

Processor 722 is operable to execute an AIC algorithm to control signal processor 716 to adjust the phase, the amplitude or both of the RF signal coupled from transmission line 718 by RF coupler 710 and programmable delay 714 to match a delay in cancellation path 720 to a propagation delay in transmission line 718.

WLAN radio controller 702 may include multiple transceivers to operate in a multiple-in multiple-out (MIMO) architecture. The two transceivers of WLAN radio controller 702 may both operate at frequencies of or around 2.45 GHz or 5 GHz, for example. It should be noted that WLAN is the industry name for wireless local area network communication technology related to the IEEE 802.11 family of wireless networking standards. ZIGBEE radio controller 704 includes a transceiver that may also operates at frequencies of or around 2.4 GHz and may implement BLUETOOTH technology.

In embodiments, the antenna architecture of communication system 700 may include additional RF radios and/or other communication modules, such as a wireless local area network (WLAN) radio, a GPS receiver, a near field communication (NFC) radio, an amplitude modulation (AM) radio receiver, a frequency modulation (FM) radio receiver, a personal area network (PAN) radio, a Global Navigation Satellite System (GNSS) receiver, or the like. Communication system 700 may also include receivers and/or transmitters, filters, amplifiers, mixers, switches, and/or other electrical components.

When implementing AIC, processor 722 is configured to determine amplitude and phase of a signal for cancellation according to one embodiment. To implement AIC, processor 722 first implements a calibration routine by controlling the RF radios of communication system 700, including WLAN radio controller 702 and ZIGBEE radio controller 704. Typically, during calibration, WLAN radio controller 702 is configured to transmit an RF signal via antenna 706, while ZIGBEE radio controller 704 is configured to listen for an RF signal received via antenna 708. As described above, the WLAN signal transmitted via antenna 706 will typically cause an interfering signal to be generated at antenna 708 by electromagnetic coupling. That interfering signal may then be received by ZIGBEE radio controller 704 and may ultimately interfere with the operations of ZIGBEE radio controller 704. With WLAN radio controller 702 transmitting, RF coupler 710 transmits a signal that is a duplicate of the signal transmitted by WLAN radio controller 702 along cancellation path towards signal processor 716. A power level of the signal received by ZIGBEE radio controller 704 can then be determined. The signal received by ZIGBEE radio controller 704 will be the combination of the interference signal generated by the transmission of the WLAN radio signal through antenna 706 and the signal transmitted though signal processor 716.

Processor 722 then adjusts the delay imposed on the signal transmitted through cancellation path 720 by programmable delay 714 and the attenuation and phase adjustments of the signal by signal processor 716 to generate a modified signal that destructively interferes with the interference signal generated by the transmission of the WLAN radio signal through antenna 706.

To select an appropriate delay to be generated by programmable delay 714 and appropriate attenuation and phase shifts generated by signal processor 716 to generate the destructive signal, processor 722 uses an iterative process that involves testing a number of different delay, attenuation and phase shift settings. For each combination of settings, processor 722 determines a magnitude of the signal received by ZIGBEE radio controller 704. When the received signal has reached a minimum power level (or a power level that falls below a predetermined threshold power level), processor 722 may determine that the corresponding delay, attenuation, and phase shift settings result in the transmission of a signal along cancellation path 720 that destructively interferes with the interference signal generated by the transmission of the WLAN radio signal through antenna 706.

Accordingly, processor 722 first selects an attenuation level and phase shift for signal processor 716. Processor 722 then determines a magnitude of a signal received by ZIGBEE radio controller 704 when a test signal is transmitted by WLAN radio controller 702 and those settings are utilized. This may be done by the processing logic requesting a status from the ZIGBEE radio controller 704 such as to obtain RSSI, SNR, or the like of a signal received by ZIGBEE radio controller 704. Processor 722 then stores in memory a power level as determined by the requested status and associates that power level with the corresponding attenuation level and phase shift settings. Processor 722 then goes on to set signal processor 716 to another attenuation level and phase shift and processor 722 repeats the power level measurement by causing WLAN radio controller 702 to retransmit the same test signal. This measurement process is repeated for a range of possible attenuation levels and phase shifts. Having performed power measurements over a range of attenuation levels and phase shifts, processor 722 can determine the attenuation level and phase shift settings that corresponds to a minimum received power level of ZIGBEE radio controller 704. Signal processor 716 can then be set to that attenuation level and phase shift and normal operation of both WLAN radio controller 702 and ZIGBEE radio controller 704 may resume. In different environments, the calibration process may be repeated because different attenuation levels and phase shifts may provide more effective interference mitigation.

After the AIC calibration process has been executed and normal network communication operations have resumed, network communication conditions may be monitored to determine whether the AIC requires recalibration. Due to changes in network conditions (e.g., if the set of channels allocated to one or more of the device's radio controllers) or environmental conditions, the attenuation levels and phase shift established for signal processor 716 during a previous calibration process may no longer provide effective interference cancellation. For example, processor 722 may determine that a rate of packet transmissions by either WLAN radio controller 702 or ZIGBEE radio controller 704 has fallen below a threshold level indicating increased levels of network interference. Alternatively, processor 722 may monitor the received signal power levels (e.g., RSSI) of signals received by either WLAN radio controller 702 or ZIGBEE radio controller 704, and, upon determining that the received signal power levels of one or both controller have fallen below threshold values (either the same threshold value, or each controller may be associated with a different threshold value), processor 722 may initiate a recalibration process to update the AIC implementation.

Similarly, the channel allocation to one or more of WLAN radio controller 702 and ZIGBEE radio controller 704 have changed or been updated, which may trigger AIC recalibration.

Returning to FIG. 6, in step 614 the processor determines whether the electronic device is configured with programmable filters to implement received signal filtering for either WLAN radio controller 702 or ZIGBEE radio controller 704. In an embodiment, a value indicating whether the device is configured with such programmable filters may be encoded within a memory of communication system 220 of device 104. Such an indicator or flag may be established at the time of manufacture of the electronic device and, specifically, communication system 220, and can indicate a status of the hardware of communication system 220 and an indication of specific features, such as the programmable filters, supported by communication system 220. Accordingly, to determine whether such programmable filters are supported, the processor may be configured to access a memory of communication system 220 to determine whether a flag indicating support of programmable filters is present. If the programmable filters are not supported, the method ends at step 604. If programmable filters are supported, in step 616 the programmable filters are configured to reduce interference.

Figure 8:
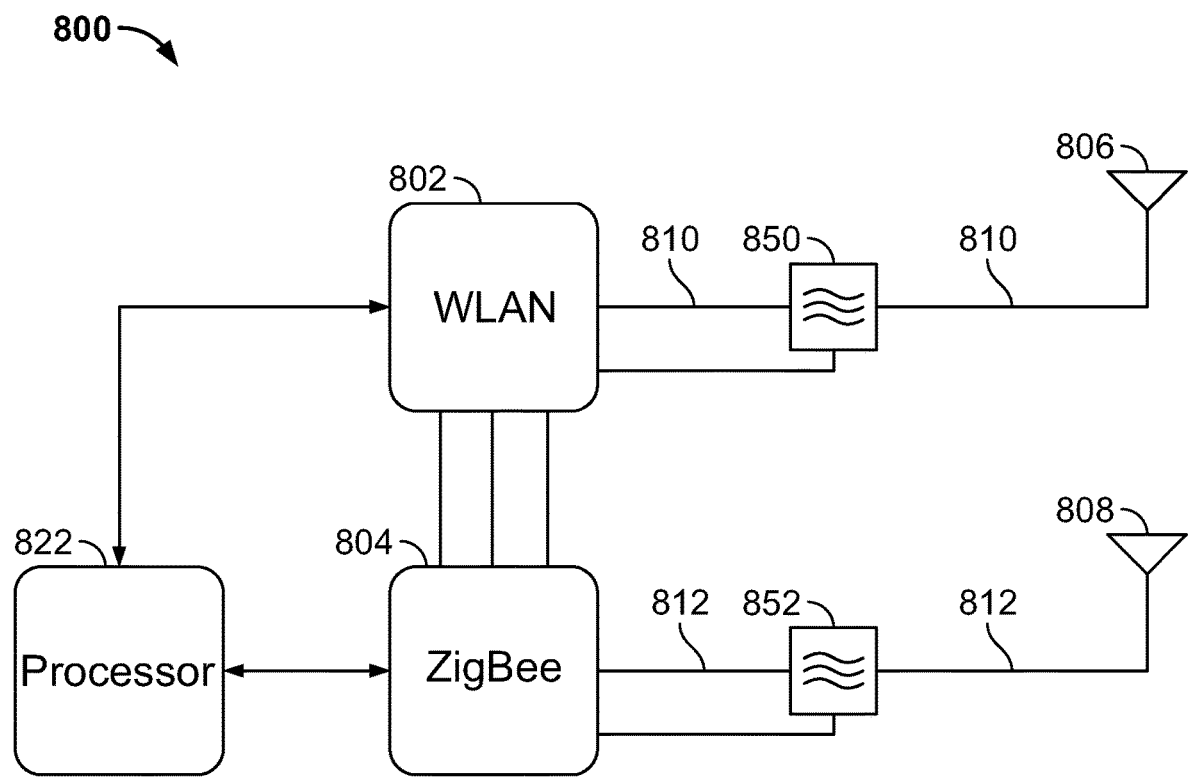
FIG. 8 is a block diagram of a communication system that includes programmable filters for interference mitigation.

FIG. 8 is a block diagram of communication system 800 including programmable filters for interference mitigation. Communication system 800 includes WLAN radio controller 802 and ZIGBEE radio controller 804. WLAN radio controller 802 is connected to antenna 806 by transmission line 810 and ZIGBEE radio controller 804 is connected to antenna 808 by transmission line 812.

Programmable filter 850 is connected to transmission line 810 and is configured to filter a signal passing along transmission line 810 through programmable filter 850. Programmable filter 850 is programmable to select a particular range of frequencies that programmable filter 850 is configured to filter out of the signal passing through programmable filter 850. Signal frequencies that fall outside the range of frequencies that programmable filter 850 is configured to filter out of the signal pass through programmable filter 850 without modification.

Similarly, programmable filter 852 is connected to transmission line 812 and is configured to filter a signal passing along transmission line 812 through programmable filter 852. Programmable filter 852 is programmable to select a particular range of frequencies that programmable filter 852 is configured to filter out of the signal passing through programmable filter 852. Signal frequencies that fall outside the range of frequencies that programmable filter 852 is configured to filter out of the signal pass through programmable filter 852 without modification.

Processor 822 is operable to execute an algorithm for configuring both programmable filter 850 and programmable filter 852 to provide interference mitigation.

Typically, signals transmitted by WLAN radio controller 802 using antenna 806 may electromagnetically couple to antenna 808 and generate an interfering signal that is transmitted from antenna 808 along transmission line 812 to ZIGBEE radio controller 804. Conversely, signals transmitted by ZIGBEE radio controller 804 using antenna 808 may electromagnetically couple to antenna 806 and generate an interfering signal that is transmitted from antenna 806 along transmission line 810 to WLAN radio controller 802.

To provide interference mitigation, processor 822 is configured to configure both programmable filter 850 and programmable filter 852 to reduce the magnitude of interfering signal that may couple to antennas 806 or 808 and be transmitted along transmission lines 810 or 812 resulting in interference.

In accordance with step 616 of FIG. 6, therefore, processor 822 is configured to determine the frequencies of operation of both WLAN radio controller 820 and ZIGBEE radio controller 804 and, thereby, the frequencies of signals that both controllers are actively receiving. Specifically, processor 822 determines the channels that have been assigned to each radio controller, for example, using the attributes of the configured radio controllers received in step 606 of FIG. 6.

Having determined which channels have been allocated to each radio controller, processor 822 can determine the range of frequencies that are in-use by WLAN radio controller 802 and the range of frequencies that are in-use by ZIGBEE radio controller 804. If both WLAN radio controller 802 and ZIGBEE radio controller 804 have been allocated communication channels associated with the same set of frequencies, the processor may determine that the use of programmable filters 850 and 852 may not provide adequate interference cancellation (as the filters would filter both useable signals as well as interfering signals) and may, accordingly, not configure either of programmable filters 850 and 852 to filter signals passing there-through.

If the frequencies associated with the allocated communication channels of either radio controller are not the same, processor 822 configures programmable filter 850 to filter signals having frequencies that fall outside the range of frequencies that are in-use by WLAN radio controller 802. For example, if WLAN radio controller 802 has been allocated channels having a range of frequencies from 2.41 GHz to 2.43 GHz, processor 822 may configure programmable filter 850 to filter (i.e., remove) signals passing through programmable filter 850 having frequencies less than 2.40 GHz and greater than 2.44 GHz. In this manner, potentially interfering signals having frequencies that fall outside the frequencies that are in-use by WLAN radio controller 802 can be filtered out of the signal received by WLAN radio controller 802 reducing the likelihood of potential interference.

Similarly, processor 822 configures programmable filter 852 to filter signals having frequencies that fall outside the range of frequencies that are in-use by ZIGBEE radio controller 804. For example, if ZIGBEE radio controller 804 has been allocated channels having a range of frequencies from 2.43 GHz to 2.44 GHz, processor 822 may configure programmable filter 852 to filter (i.e., remove) signals passing through programmable filter 852 having frequencies less than 2.42 GHz and greater than 2.44 GHz. In this manner, potentially interfering signals having frequencies that fall outside the frequencies that are in-use by ZIGBEE radio controller 804 can be filtered out of the signal received by ZIGBEE radio controller 804 reducing the likelihood of potential interference.

In some embodiments of communication system 800 only one of programmable filter 850 and programmable filter 852 may be implemented or present. In such an implementation, the single programmable filter may be configured in the same manner as that described above. Namely, the channels assigned to the radio controller to which the programmable filter is connected are determined and used to identify the range of signal frequencies utilized by the radio controller. The programmable filter is then configured to filter (i.e., remove) signals having frequencies that fall outside of that frequency range to provide interference mitigation.

The method illustrated in FIG. 6 enables an electronic device, such as electronic device 104 to implement one or more hardware-based solutions to provide interference mitigation. The method includes steps (e.g., steps 610 and 614) that enable the electronic device to determine whether the particular hardware-based solutions are available (e.g., that the solutions are implemented within the electronic device) and then steps (e.g., steps 612 and 616) to implement those hardware solutions.

Once configured, the hardware interference mitigation solutions (e.g., the use of AIC or programmable signal filters) are generally static or unchanging over time. For example, for the AIC solution, the attenuation level and phase shift of signal processor 716 may be generally unchanged for an extended period of network communications. Similarly, when using programmable filters, the filter configurations may be generally unchanging as electronic device 104 operates.

During electronic device operation, however, the processor (e.g., processor 202 of device 104) may be configured to detect one or more conditions that may cause the method of FIG. 6 to be re-executed, thereby recalibrating both the AIC solution and programmable filter solution. For example, if the channel allocations to any of the radio controllers in the electronic device change or are updated, the method of FIG. 6 may be re-executed. Similarly, if a new radio controller is configured (e.g., a radio controller is switched on or switched off), the method may be re-executed. In some cases, the processor may monitor communication conditions (e.g., the packet transfer rates of any of the device's radio controllers or the received signal strength of any of the controllers). If the conditions deteriorate (e.g., the packet transfers rates of one or more radio controllers falls below a particular threshold or the received signal strength for any of the radio controllers falls below a threshold value), the processor may re-execute the method of FIG. 6 so as to update the configuration of the device's hardware-based interference mitigation solutions.

In the method of FIG. 6, it should be understood that the steps for implementing AIC (e.g., steps 610 and 612) and the steps for using the programmable filters (e.g., steps 614 and 616) may be executed in any order. Accordingly in an electronic device that provides hardware solutions for both AIC and programmable filters, the programmable filters may be configured first, with the AIC solution being calibrated and implemented after the programmable filters have been configured. Or both solutions may be calibrated and configured concurrently.

In addition to hardware solutions, the electronic device may be configured to execute one or more software-based solution to provide interference mitigation. Specifically, in an electronic device having both a WLAN radio controller and ZIGBEE radio controller, the device may be configured to limit the transmit power for WLAN-based communications to transmit power levels below a maximum transmit power, where the maximum transmit power is selected to both enable satisfactory WLAN communication performance, while also reducing or minimizing an amount of interference generated at the device's ZIGBEE radio controller by the WLAN transmissions.

When WLAN transmissions couple to the antenna coupled to the ZIGBEE radio controller, the coupled interference signals can boost the power level of the signal received by the ZIGBEE radio controller. This can, in turn, cause the received signal to clip when the received signal is amplified by the ZIGBEE controller. Signal clipping refers to a signal distortion that results when the power level of a received signal exceeds a maximum threshold that the corresponding radio controller can process. This signal distortion causes data to be lost and can make it difficult for the radio controller to decode the received signal. To reduce the instances of signal clipping resulting from interference from WLAN transmissions, the electronic device may also implement a method to reduce the amplification applied by the device's ZIGBEE radio controller. This reduced amplification can reduce instances of signal clipping thereby increasing the likelihood that the ZIGBEE radio controller can decode received signals and can act to mitigate interference that may be generated by a collocated WLAN radio controller, for example.

Figure 9:
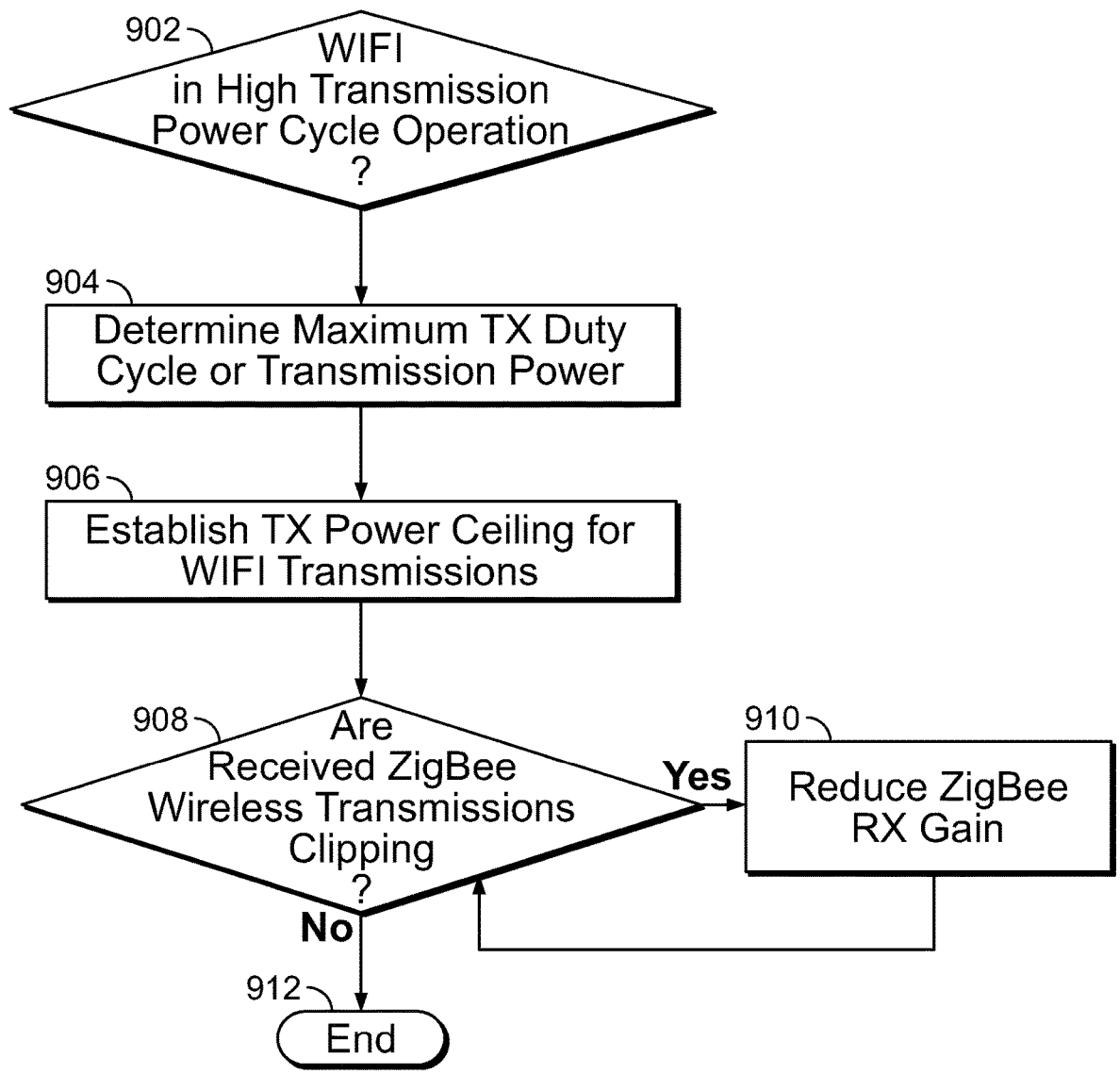
FIG. 9 is a flowchart depicting a method for a controller or processor of an electronic device to implement software-based approaches for interference mitigation.

FIG. 9 is a flowchart depicting a method for a controller or processor of the device (e.g., processor 202 of device 104 operating in combination with a controller of the device's communication system 220) to implement software-based approaches for interference mitigation. Although the method of FIG. 9 is described in terms of specific communication protocols and the hardware components and circuitry associated with those protocols, it should be understood that the method of FIG. 9 may be employed to mitigate interference that may result from the operations of two or more radio controllers implementing any combination of communication protocols. Specifically, the method of FIG. 9 is described generally in terms of interference mitigation in an electronic device having WLAN and ZIGBEE radio controllers, though it should be understood that the method may be implemented by a device having any combination of radio controllers implementing the same or different combinations of wireless communication protocols.

In step 902 the processor determines whether the device's WLAN radio controller is operating in mode of operation or providing a particular functionality requiring relatively high-power signal transmissions. For example, the processor may determine whether the WLAN radio controller is transmitting WLAN communications using a duty cycle that exceeds a particular predetermined threshold (e.g., 50%). In some cases, the processor may determine whether the device's WLAN radio controller is operating in mode of operation requiring relatively high-power signal transmissions by detecting one or more active processes or programs being executed by processor 202 the electronic device. For example, if the processor detects that the electronic device is executing a video or audio conferencing or telephony program or process, implementing voice-based communications (e.g., a voice based functionality that processes a user's spoken instructions received via a microphone) or other voice recognition function, or executing a music or media streaming activity, that may indicate that the WLAN radio controller of the device is operating in a high-power transmission mode or a mode of operation that should promote successful WLAN communications. In still other embodiments, the processor may determine that the WLAN radio controller is in a high-power transmission mode by determining that the TCP/IP stack of the WLAN radio controller has exceeded a predetermined threshold of usage (e.g., 50%) requiring high-power transmission activities.

Typically, while executing these activities that require a high-transmit power, a WLAN radio controller may simply be configured to transmit at the controller's maximum transmit power so as to ensure that WLAN transmission occur at maximum power and have a higher likelihood of being successfully received. But such behavior may not be necessary. Even when undergoing an activity that may require a high-transmit power, the WLAN radio controller may achieve satisfactory performance (e.g., achieve a satisfactory packet transfer rate) without transmitting at the controller's maximum output power. Accordingly, in certain conditions the transmit power of the WLAN radio controller may be reduced or limited while still allowing the WLAN radio controller to achieve satisfactory performance.

In step 904, the processor determines a ceiling transmit power—typically expressed as a maximum duty cycle—that is to be utilized by the device's WLAN radio controller. The ceiling transmit power may be determined based upon attributes of the ZIGBEE radio controller. In an embodiment, the processor is configured to determine a maximum signal power level that can be received and processed by the device's ZIGBEE radio controller. The maximum signal power level may be referred to as the ZIGBEE radio controller's saturation threshold. In some cases, the saturation threshold may be a predetermined value for the ZIGBEE radio controller. Alternatively, the saturation threshold may be determined by the processor causing the WLAN radio controller to transmit test messages at gradually increasing power levels. As the test messages are transmitted by the WLAN radio controller, a portion of the test messages will couple to the ZIGBEE radio controller's transmission line to form an interference signal. Initially, the coupled interference signal will be successfully received and processed by the ZIGBEE radio controller, but as the magnitude of the coupled interference signal increases, the ZIGBEE radio controller will eventually be unable to process the coupled interference signal and will report that the ZIGBEE radio controller is saturated. At that point the ZIGBEE radio controller can determine the saturation threshold as the highest RSSI of the interference signal that was successfully received and processed by the ZIGBEE radio controller.

The processor may also determine a packet loss threshold for the ZIGBEE radio controller. The packet loss threshold is a percentage value indicating a maximum allowable percentage of ZIGBEE packets that may be dropped (i.e., unsuccessfully received) during ZIGBEE communications. The packet loss threshold may be a fixed value for the ZIGBEE radio controller or may depend upon the current communication activity or active connections of the ZIGBEE radio controller. For example, different packet loss thresholds may be associated with ZIGBEE wireless communications via active connections with different types of ZIGBEE devices. If, for example, the ZIGBEE radio controller has an active connection to a smart lightbulb, the packet loss threshold may be set relatively high (e.g., 10% or 30%) because interruptions in communications with devices such as lightbulbs may be more tolerable. For other types of ZIGBEE activities, the packet loss threshold may be lower. For example, if the ZIGBEE radio controller has an active connection to a fire alarm sensor, smoke alarm, or the like, the packet loss threshold may be set relatively low (e.g., 5% or 1%) because interruptions in communications with devices such as smoke alarms and fire alarms may be less tolerable. The processor may determine the packet loss threshold using a table that associates particular types of ZIGBEE network communication activities (i.e., communication with particular types of ZIGBEE devices) with a packet loss threshold.

With the packet loss threshold determined, the processor determines whether the current duty cycle of the WLAN radio controller exceeds the packet loss threshold for ZIGBEE communications. If the duty cycle of the WLAN radio controller exceeds the packet loss threshold, that indicates that for a particular time period, the WLAN controller could interfere with a percentage of ZIGBEE packets exceeding the packet loss threshold.

If the duty cycle of the WLAN radio controller exceeds the packet loss threshold, the processor then determines whether the coupling between the WLAN radio controller (e.g., the transmission path or transmission line connected to the WLAN radio controller) and the ZIBEE radio controller exceeds the ZIGBEE radio controller's saturation threshold. The coupling between the WLAN radio controller and the ZIGBEE radio controller may be determined based upon the current transmit power of the WLAN radio controller. Specifically, the two known values on board rejection and antenna isolation are subtracted from the current transmit power of the WLAN radio controller. On board rejection and antenna isolation are both values that may be determined at the time of manufacture of the device and are generally unchanging over time as the device operates.

If the duty cycle of the WLAN radio controller exceeds the packet loss threshold and the coupling between the WLAN radio controller and the ZIBEE radio controller exceeds the ZIGBEE radio controller's saturation threshold, that indicates a high likelihood that the transmission of the WLAN radio controller will interfere with the ZIGBEE radio controller's communication activities and that the interference is likely to result in sufficient interference to cause ZIGBEE packet loss exceeding the packet loss threshold. In that case, the processor sets a ceiling transmit power for the WLAN radio controller by reducing the WLAN transmit power to a value equal to the current transmit power minus a value equal to the ZIGBEE to a value equal to the ZIGBEE saturation threshold minus the coupling between the WLAN radio controller and the ZIBEE radio controller.

If, however, either the duty cycle of the WLAN radio controller does not exceed the packet loss threshold or the coupling between the WLAN radio controller and the ZIBEE radio controller does not exceed the ZIGBEE radio controller's saturation threshold, the ceiling can be set to the current transmit power of the WLAN radio controller.

Having determined a ceiling transmit power for the device's WLAN radio controller, the processor controls the device's WLAN radio controller to limit communications to that transmit power in step 906.

By setting a maximum transmit power for the WLAN radio controller, the amount of interference occurring at the device's ZIGBEE radio controller may be minimized or reduced. But even at reduced transmit powers, portions of the communication signals transmitted by the WLAN radio controller may couple to the ZIGBEE radio controller's antenna resulting in interference. Specifically, the coupled signal will combine with any concurrently received ZIGBEE communications resulting in the signal power of the signal received by the ZIGBEE radio controller being increased—the received signal will be the sum of the received ZIGBEE communication signal and any concurrent interference signal received via coupling with WLAN communications.

Before processing a received signal, an analog-to-digital converter (ADC) of or connected to the ZIGBEE radio controller first amplifies the received signal before converting the amplified analog signal into a digital data stream. If the power level of the signal received by the ZIGBEE radio controller is too great, the amplification of the received signal can result in signal clipping and data loss. In the event of signal clipping, it is very likely that data contained within the received signal will be lost as signal decoding may be very likely to fail. If the signal were to be successfully received and amplified without clipping, the ZIGBEE radio controller may be able to decode data transmissions encoded within the received signal, even if portions of the received signal include the interfering signal generated by concurrent WLAN communications transmission.

Accordingly, in step 908, the processor determines whether signals being received at the device's ZIGBEE radio controller have been clipping. The processor may detect clipping by determining that the ZIGBEE radio controller has been experiencing packet loss or partially-received packets. In some cases, the processor may access the ZIGBEE radio controller directly to determine that the ZIGBEE radio controller is experiencing clipping of received signals. For example, the ZIGBEE radio controller may be configured to inform the processor that the ZIGBEE radio controller's receiver is saturated and that the magnitude of the signals being received by the ZIGBEE radio controller are exceeding the maximum signal magnitude that the ZIGBEE radio controller is configured to receive. This may involve determining whether all received ZIGBEE transmissions have been clipping. In some cases, however, the processor may limit the investigation of whether the received ZIGBEE transmissions have been clipping to ZIGBEE transmissions received from remote devices with which the device has an established ZIGBEE connection. To determine whether packets being received from particular devices are clipping, the processor may determine whether periodic transmissions received from the target devices are resulting in lost packets or partially-received packets or whether the ZIGBEE radio controller is experiencing saturation at times packets are being received from those devices.

If the received ZIGBEE transmissions are determined in step 908 to have been clipping (indicating a high likelihood of ZIGBEE data loss), in step 910 the processor reduces a gain of the ZIGBEE radio controller's ADC circuitry. Gain reduction may involve instructing the amplifier to switch a linear gain mode that may result in a reduced gain as compared to normal modes of operation of the amplifier. For example, the ADC may be configured to run at a number of distinct gain levels (e.g., 5 decibels (dB), 10 dB, and 15 db). If, in step 910 it is determined the received ZIGBEE transmissions are clipping, the processor may cause the ADC of the ZIGBEE radio controller to operate at a gain level that is the next gain level lower than the current gain level of the ADC. Alternatively, if, in step 910 it is determined the received ZIGBEE transmissions are clipping, the processor may cause the ADC of the ZIGBEE radio controller to operate at a gain level that is a percentage (e.g., 5% or 10%) lower than the current gain level of the ADC.

After adjusting the gain level of the ADC in the ZIGBEE radio controller, the method returns to step 908 and the processor again determines whether received ZIGBEE wireless transmissions are clipping. If so, the gain of the ADC in the ZIGBEE radio controller is again reduced in step 910. But if the received ZIGBEE wireless transmissions are no longer clipping, the method ends at step 912.

The method depicted in FIG. 9 enables an electronic device, such as electronic device 104 to implement one or more software-based solutions to provide interference mitigation. The method of FIG. 9 may be executed at a regular frequency so that the mitigation approaches (e.g., the WLAN transmit power ceiling of steps 904 and 906 and the ZIGBEE gain reductions of steps 908 and 910) can be re-executed and updated at regular intervals. For example, if the device ends a telephony application, voice-control operation, or media streaming activity, the WLAN transmit power ceiling and ZIGBEE gain may be adjusted due to the device's new operating conditions (e.g., by returning both to normal modes of operation). Similarly, one of more changes in the state of the device may result in re-execution of the method of FIG. 9. For example, if the channel allocations to any of the radio controllers in the electronic device change or are updated, the method of FIG. 9 may be re-executed. Similarly, if a new radio controller is configured (e.g., a radio controller is switched on or an in-use radio controller is switched off), the method may be re-executed. In some cases, the processor may monitor communication conditions (e.g., the packet transfer rates of any of the device's radio controllers or the received signal strength of any of the controllers). If the conditions deteriorate (e.g., the packet transfers rates of one or more radio controllers falls below a particular threshold or the received signal strength for any of the radio controllers falls below a threshold value), the processor may re-execute the method of FIG. 9 so as to update the configuration of the device's hardware-based interference mitigation solutions.

In the method of FIG. 9, it should be understood that the steps for implementing the WLAN TX power ceiling (e.g., steps 904 and 906) and the steps for reducing ZIGBEE RX gain (e.g., steps 908 and 910) may be executed in any order and, in some cases, may be executed substantially concurrently.

As described above, the method of FIG. 9 determines that the device's WLAN radio controller is operating in a high-power transmission mode (or is undertaking a task or performing a function that requires high-power transmissions) and, based on that determination, may take action to reduce a gain of the ADC of the device's ZIGBEE radio controller. As discussed above, this step can preventing signal clipping within the ZIGBEE radio controller and may, in turn, increase the likelihood that ZIGBEE transmissions are successfully received. The device may then detect that the WLAN controller has exited the high-power mode of operation (of has completed the task or function that required high-power operation) and can then return the ADC of the ZIGBEE radio controller to a normal gain level in accordance with normal operation of the ZIGBEE radio controller.

Although such an approach can result in improved receipt of ZIGBEE transmissions during the WLAN radio controller's high-power operation, the approach may result in the gain of the ZIBGEE radio controller's ADC being reduced for an extended period of time. If, for example, the electronic device is used to perform a function that calls for high-power WLAN transmissions for an extended period of time (e.g., streaming music or participating in a video call), the ZIGBEE radio controller's ADC gain may be reduced for the entire time period the function is performed, which may extended for several minutes or hours. During the performance of the function, however, there will be periods of time when the WLAN radio controller is not actively transmitting data packets. During those time periods, the likelihood of signal clipping within the ZIGBEE radio controller is significantly reduced. Accordingly, when the WLAN radio controller is not active, the gain of the ADC in the ZIGBEE radio controller may be raised to normal operational levels.

Controlling the gain of the ZIGBEE radio controller's ADC in this manner may require that the gain be modified at a very high frequency. When the WLAN radio controller begins transmitting, the gain may preferably be reduced in a very short time period—on the order of microseconds. Such responsiveness may be challenging to achieve in a software-based solution. Accordingly, the present electronic device may incorporate a hardware-based solution to reduce the ZIGBEE radio controller's ADC gain during WLAN transmissions.

Figure 10:
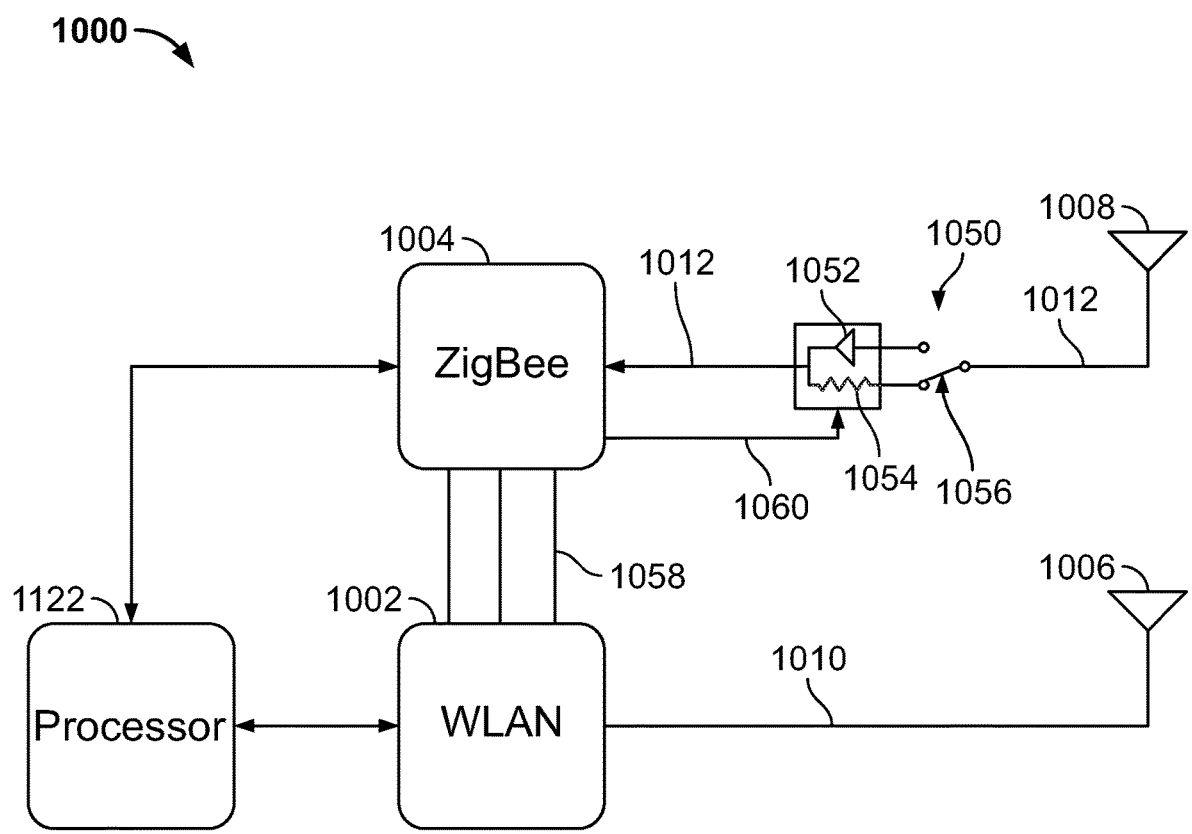
FIG. 10 is a block diagram of a communication system configured to adjust a gain of a ZIGBEE radio controller based upon a transmit status of a WLAN radio controller.

FIG. 10 is a block diagram of communication system 1000 configured to adjust a gain of the system's ZIGBEE radio controller based upon a transmit status of the system's WLAN radio controller. Communication system 1000 includes WLAN radio controller 1002 and ZIGBEE radio controller 1004. WLAN radio controller 1002 is connected to antenna 1006 by transmission path 1010 and ZIGBEE radio controller 1004 is connected to antenna 1008 by transmission path 1012.

Transmission path 1012 includes a bypass system 1050 between antenna 1008 and ZIGBEE radio controller 1004. Bypass system 1050 includes two independent conduction paths. A first path includes amplifier 1052 that is configured to amplify an analog signal received from antenna 1008. Amplifier 1052 is part of the ADC of ZIGBEE radio controller 1004. A second path in bypass system 1050 represents a shunted loss path. The second path does not include an amplifier and instead passes an unamplified version of the signal received from antenna 1008 though impedance 1054. The path through impedance 1054 is connected to ZIGBEE radio controller 1004 in parallel to amplifier 1052. Impedance 1054 may be a separate component of communication system (e.g., a resistor) or impedance 1054 may represent the transmission line (with no additional component) that connects antenna 1008 to ZIGBEE radio controller 1004 without passing through amplifier 1052.

As depicted in FIG. 7, bypass system 1050 may be external to ZIGBEE radio controller 1004. In some implementations, however, bypass system 1050 may be implemented within the same chip or integrated circuit as ZIGBEE radio controller 1004, in which case bypass system 1050 may be implemented as a logical subsystem or component of the processor or combination of processors implementing the functionality of ZIGBEE radio controller 1004.

During normal operation of bypass system 1050 (i.e., when ZIGBEE radio controller 1004 is receiving and processing received ZIGBEE communications without communication system 1000 implementing interference mitigation), switch 1056 is activated to connect ZIGBEE radio controller 1004 to antenna 1008 through amplifier 1052. This enables amplifier 1052 to amplify the analog radio signal received from antenna 1008 before the amplified analog signal is converted to a digital signal by ZIGBEE radio controller 1004 for data processing.

When WLAN radio controller 1002 is actively transmitting WLAN data using antenna 1006, however, switch 1056 is activated to connect antenna 1008 to the impedance path containing impedance 1054 and, effectively, thereby disconnect amplifier 1052. By bypassing amplifier 1052, the likelihood that the WLAN transmissions from antenna 1006 will electromagnetically couple to antenna 1008 or transmission line 1012 to create an interference signal that, once combined with a ZIGBEE transmission received using antenna 1008, will cause the signal, once amplified by amplifier 1052, to cause signal clipping at an input of ZIGBEE radio controller 1004 can be reduced.

When the WLAN transmission has completed and WLAN radio controller 1002 is no longer actively transmitting through antenna 1006, switch 1056 can be returned to the original state to connected antenna 1008 to ZIGBEE radio controller 1004 through amplifier 1052.

The configuration of switch 1056 may be changed rapidly so as to either connect or disconnect amplifier 1052 from transmission path 1012 on a per-packet basis as WLAN radio controller 1002 operates. Accordingly, when WLAN radio controller 1002 begins transmitting a packet, switch 1056 may be adjusted to remove amplifier 1052 from transmission path 1012 and, upon completion of the packet transmission by WLAN radio controller 1002, switch 1056 can be again adjust to include amplifier 1052 in transmission path 1012.

Because the configuration of switch 1056 may be adjusted on a per-packet basis, switch 1056 is configured to change conduction state at a relatively high frequency. Switch 1056 may be configured to provide minimal attenuation of a signal passing through switch 1056. Additionally, switch 1056 may be configured to operate at relatively high frequencies —specifically on the order of the frequency with which WLAN radio controller 1002 transmits packets and may be as high as 100 megahertz or above 1 GHz.

WLAN radio controller 1002 includes an output configured to indicate the WLAN radio controller 1002 is actively transmitting. The output may be, for example, a general purpose input/output (GPIO) pin incorporated into the integrated circuit (IC) chip in which WLAN radio controller 1002 is implemented. Such a pin may have, for example, a high voltage value when WLAN radio controller 1002 is transmitting and a low voltage value when WLAN radio controller 1002 is not transmitting. The output pin of WLAN radio controller 1002 is connected to ZIGBEE radio controller 1004 via signal line 1058. In this manner, ZIGBEE radio controller 1002 receives a hardware-level input signal (i.e., the voltage level of signal line 1058) that indicates the current transmission state of WLAN radio controller 1002. ZIGBEE radio controller 1004 can then, in turn, use the input received from signal line 1058 to determine a desired state of switch 1056 and control switch 1056 via signal line 1060 accordingly. Specifically, when the input received from signal line 1058 indicates that WLAN radio controller 1002 is actively transmitting, ZIGBEE radio controller 1004 controls switch 1056 to include amplifier 1052 in transmission path 1015 and connect amplifier 1052 to antenna 1008 and ZIGBEE radio controller 1004. Conversely, when the input received from signal line 1058 indicates that WLAN radio controller 1002 is not actively transmitting, ZIGBEE radio controller 1004 controls switch 1056 to exclude amplifier 1052 from transmission path 1015 thereby disconnecting amplifier 1052 from antenna 1008 and ZIGBEE radio controller 1004.

In embodiments, where communication system 1000 includes other radio controllers (e.g., a BLUETOOTH radio controller), ZIGBEE radio controller 1004 may similarly receive inputs from the other radio controllers indicating whether those radio controller are actively transmitting via respective antennas. If the inputs indicate that the other radio controllers are actively transmitting, ZIGBEE radio controller 1004 may similarly activate switch to temporarily disconnect amplifier 1052 from transmission path 1012 when the other radio controllers are actively transmitting.

FIGS. 7, 8, and 10 each depict communication systems that include hardware arrangements configured to mitigate interference between the two or more radio communication controllers of a communication system. Specifically, FIG. 7 depicts a hardware configuration that utilizes a signal processor in combination with a programmable delay to implement active interference cancellation. FIG. 8 depicts a configuration that incorporates programmable filters on the communication paths of each communication controller that may each be configured to minimize interference occurring between the communication controllers. FIG. 10 depicts a hardware configuration that utilizes an optional impedance path to reduce a gain of one of the device's radio controllers.

Although FIGS. 7, 8, and 10 each depict these hardware configurations separately, it should be understand that the various hardware configurations may be combined into a single communication system that may be utilized within an electronic device. To illustrate, FIG. 11 is a block diagram depicting a configuration of communication system 1100 configured to implement a number of hardware-based solutions to implement interference mitigation between radio communication controllers of the communication system.

Figure 11:
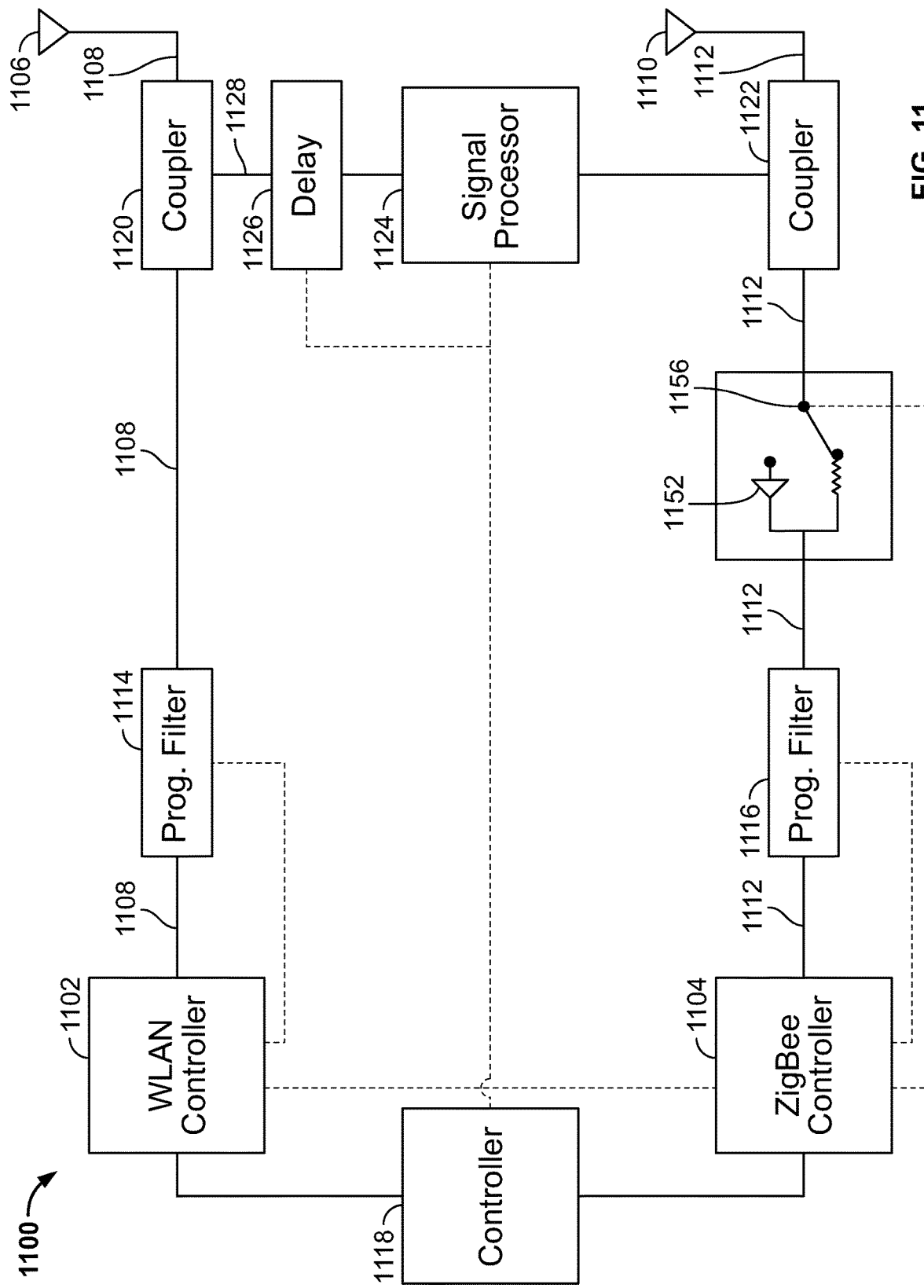
FIG. 11 is a block diagram depicting a configuration of a communication system configured to implement a number of hardware-based solutions to implement interference mitigation between radio communication controllers of the communication system.

In the example configured depicted in FIG. 11, communication system includes WLAN radio controller 1102 (e.g., WLAN radio controller 702, 802, or 1002) and ZIGBEE radio controller 1104 (e.g., ZIGBEE radio controller 704, 804, and 1004), though it should be understood that communication system 1100 may include different numbers of radio controllers configured to implement different communication protocols. WLAN radio controller 1102 is connected to antenna 1106 (e.g., antenna 706, 806, or 1006) through transmission line or path 1108. ZIGBEE radio controller 1104 is connected to antenna 1110 (e.g., antenna 708, 808, or 1008) through transmission line or path 1112.

Programmable filter 1114 is connected to transmission path 1108 between WLAN radio controller 1102 and antenna 1106. Programmable filter 1114 is configured to filter a signal passing along transmission path 1108 through programmable filter 1114. Programmable filter 1114 is programmable to select a particular range of frequencies that programmable filter 1114 is configured to filter out of the signal passing through programmable filter 1114. Programmable filter 1114 may be configured in a similar manner as programmable filter 850 to filter interference signals that may be generated within transmission path 1108 by signals transmitted by ZIGBEE radio controller 1104 through transmission path 1112.

Programmable filter 1116 is connected to transmission path 1112 between ZIGBEE radio controller 1104 and antenna 1110. Programmable filter 1116 is configured to filter a signal passing along transmission path 1112 through programmable filter 1116. Programmable filter 1116 is programmable to select a particular range of frequencies that programmable filter 1116 is configured to filter out of the signal passing through programmable filter 1116. Programmable filter 1116 may be configured in a similar manner as programmable filter 852 to filter interference signals that may be generated within transmission path 1112 by signals transmitted by WLAN radio controller 1102 through transmission path 1108.

Each of programmable filter 1114 and programmable filter 1116 may be configured to filter particular ranges of frequencies by controller 1118 (e.g., processor 202 of device 104 or a controller within communication system 1100).

Communication system 1100 includes a first RF coupler 1120 and a second RF coupler 1122. RF coupler 1120 is coupled to transmission line 1108 between WLAN radio controller 1102 and antenna 1106. RF coupler 1120 is also connected to programmable delay 1126. Programmable delay 1126 is, in turn, connected to signal processor 1124. Signal processor 1124 is configured to modify a magnitude of a signal passing through signal processor 1124 (e.g., via an adjustable attenuator) as well as a phase of the signal passing through signal processor 1124 (e.g., via an adjustable phase shifter).

Signal processor 1124 is, in turn, connected to RF coupler 1122. RF coupler 1122 is connected to transmission line 1112 between ZIGBEE radio controller 1104 and antenna 1110.

When an RF signal is transmitted by WLAN radio controller 1102 on transmission line 1108, RF coupler 1120 creates a copy of the transmitted signal on a first cancellation path 1128. Programmable delay 1126 can be controlled by controller 1118 (e.g., processor 202 of device 104 or a controller within communication system 1100) to select a delay for cancellation path 1128. Controller 1118 executes an AIC algorithm (as described herein and in reference to FIG. 7) to control signal processor 1124 to adjust the phase, the amplitude or both of the RF signal coupled from transmission line 1108 by RF coupler 1120 and programmable delay 1126 to match a delay in cancellation path 1128 to a propagation delay in transmission line 1108, thereby generating an interference cancellation signal. Specifically, controller 1118 configures signal processor 1124 and programmable delay 1126 to modify the signal received from RF coupler 1120 to generate an output interference cancellation signal that is fed into transmission line 1112 by RF coupler 1122. The output interference cancellation signal is configured to destructively interfere with an interference signal that may be generated in transmission line 1112 by electromagnetic coupling with an RF signal being transmitted through transmission line 1108 by WLAN radio controller 1102.

Communication system 1100 includes a bypass system 1150 on transmission path 1112 between antenna 1110 and ZIGBEE radio controller 1104. Bypass system 1150 includes two independent conduction paths. A first path includes amplifier 1152 that is configured to amplify an analog signal received from antenna 1110. Amplifier 1152 is part of the ADC of ZIGBEE radio controller 1104. A second path in bypass system 1150 represents a shunted loss path. The second path does not include an amplifier and instead passes an unamplified version of the signal received from antenna 1110 though impedance 1154. The path through impedance 1154 is connected to ZIGBEE radio controller 1104 in parallel to amplifier 1152.

Bypass system 1150 may be external to ZIGBEE radio controller 1104. In some implementations, however, bypass system 1150 may be implemented within the same chip or integrated circuit as ZIGBEE radio controller 1104, in which case bypass system 1150 may be implemented as a logical subsystem or component of the processor or combination of processors implementing the functionality of ZIGBEE radio controller 1104.

During normal operation of bypass system 1150 (i.e., when ZIGBEE radio controller 1104 is receiving and processing received ZIGBEE communications without communication system 1100 implementing interference mitigation), switch 1156 is activated to connect ZIGBEE radio controller 1104 to antenna 1110 through amplifier 1152. This enables amplifier 1152 to amplify the analog radio signal received from antenna 1110 before the amplified analog signal is converted to a digital signal by ZIGBEE radio controller 1104 for data processing.

When WLAN radio controller 1102 is actively transmitting WLAN data using antenna 1106, however, switch 1156 is activated to connect antenna 1110 to impedance 1154 and, effectively, thereby disconnect amplifier 1152. By bypassing amplifier 1152, the likelihood that the WLAN transmissions from antenna 1110 will electromagnetically couple to antenna 1110 or transmission line 1112 to create an interference signal that, once combined with a ZIGBEE transmission received using antenna 1110, will cause the signal, once amplified by amplifier 1152, to cause signal clipping at an input of ZIGBEE radio controller 1104 can be reduced. When the WLAN transmission has completed and WLAN radio controller 1102 is no longer actively transmitting through antenna 1106, switch 1156 can be returned to the original state to connect antenna 1110 to ZIGBEE radio controller 1104 through amplifier 1152, thereby amplifying signals received via antenna 1110.

WLAN radio controller 1102 may include an output configured to indicate the WLAN radio controller 1102 is actively transmitting. Such an output may be generated at a GPIO pin of an integrated circuit containing the WLAN radio controller 1102. The output pin of WLAN radio controller 1102 is connected to ZIGBEE radio controller 1104 via a signal line. ZIGBEE radio controller 1104 can then, in turn, use the input received from the signal line to determine a desired state of switch 1156 and control switch 1156 accordingly. Specifically, when the input received from the signal line indicates that WLAN radio controller 1102 is actively transmitting, ZIGBEE radio controller 1104 or, alternatively, controller 1118, controls switch 1156 to exclude amplifier 1152 from transmission path 1112 and connect amplifier 1152 to antenna 1110 and ZIGBEE radio controller 1104 through impedance 1154. Conversely, when the input received from the signal line indicates that WLAN radio controller 1102 is not actively transmitting, ZIGBEE radio controller 1104 or, alternatively, controller 1118, controls switch 1156 to include amplifier 1152 in transmission path 1112 thereby connecting amplifier 1152 to ZIGBEE radio controller 1104 so that signals received from antenna 1110 are amplified.

It should be understood that the various components of communication system 1100 may be connected to their respective transmissions paths in an order or sequence that differs from that depicted. For example, for transmission line 1108 between WLAN radio controller 1102 and antenna 1106, the order or sequence of programmable filter 1114 and RF coupler 1120 may be rearranged so that RF coupler 1120 is connected to transmission line 1108 between WLAN radio controller 1102 and programmable filter 1114. Similarly, for transmission line 1112 between ZIGBEE radio controller 1104 and antenna 1110, the order or sequence of programmable filter 1116, bypass system 1150, and RF coupler 1122 may be rearranged so that the components are connected to transmission line 1112 in a different order.

The various hardware solutions depicted in FIG. 11 may be controlled and configured (e.g., by controller 1118) in accordance with the control algorithms depicted in FIGS. 6 and 9 and as described herein.

In an embodiment, a device includes a wireless local area network (WLAN) radio controller, a first antenna connected to the WLAN radio controller by a first transmission line, a ZIGBEE radio controller; and a second antenna connected to the ZIGBEE radio controller by a second transmission line. The ZIGBEE radio controller is configured to connect to an amplifier configured to increase a magnitude of a first radio frequency signal received by the second antenna. The ZIGBEE radio controller is configured to execute instructions for setting a gain of the amplifier to a first gain value, detecting that the WLAN radio controller is transmitting a second radio frequency signal using the first antenna, and setting the gain of the amplifier to a second gain value. The second gain value is less than the first gain value. The device includes a processor that is configured to execute instructions for determining that the WLAN radio controller is allocated a WLAN channel to transmit radio frequency signals using the first antenna, setting a transmit power of the WLAN radio controller to a first transmit power value, determining that the device is executing a functionality including voice communication or multimedia streaming causing the WLAN radio controller to transmit the second radio frequency signal, and determining a packet loss threshold for an active connection of the ZIGBEE radio controller. The processor is configured to execute instructions for determining that a duty cycle of the WLAN radio controller is greater than the packet loss threshold, setting the transmit power of the WLAN radio controller to a second transmit power value, wherein the second transmit power value is less than the first transmit power value, determining that a packet transfer rate associated with the WLAN radio controller is less than a minimum packet transfer rate for the functionality, and setting the transmit power of the WLAN radio controller to a third transmit power value. The third transmit power value is greater than the second transmit power value.

In another embodiment, a device includes a first controller, a second controller, and a processor. The processor is configured to execute instructions for determining that the first controller is transmitting a first radio frequency signal, setting a transmit power of the first controller to a first transmit power value, determining a duty cycle of the first controller is greater than a packet loss threshold associated with the second controller, and setting the transmit power of the first controller to a second transmit power value, wherein the second transmit power value is less than the first transmit power value.

In another embodiment, a device includes a first controller connected to a first antenna and a second controller connected to a second antenna. The second controller is connected to an amplifier configured to increase a magnitude of a first radio frequency signal received from the second antenna. The second controller is configured to execute instructions for setting a gain of the amplifier to a first gain value, determining that the first controller is transmitting a second radio frequency signal using the first antenna, and setting the gain of the amplifier to a second gain value. The second gain value is less than the first gain value.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A device, comprising:
   a wireless local area network (WLAN) radio controller;
   a first antenna connected to the WLAN radio controller by a first transmission line;
   a ZIGBEE radio controller connected to an amplifier;
   a second antenna connected to the ZIGBEE radio controller by a second transmission line and configured to receive a first radio frequency signal, wherein the ZIGBEE radio controller is configured to execute instructions for:
      setting a receive gain of the amplifier to a first gain value,
      detecting that the WLAN radio controller is transmitting a second radio frequency signal using the first antenna, and
      setting, based on the detecting, the receive gain of the amplifier to a second gain value, wherein the second gain value is less than the first gain value, and wherein the amplifier is configured to change a magnitude of the received first radio frequency signal based on the second gain value; and
   a processor that is configured to execute instructions for:
      determining that the WLAN radio controller is allocated a WLAN channel to transmit radio frequency signals using the first antenna,
      setting a transmit power of the WLAN radio controller to a first transmit power value,
      determining that the device is executing a functionality including voice communication or multimedia streaming causing the WLAN radio controller to transmit the second radio frequency signal,
      determining a packet loss threshold for an active connection of the ZIGBEE radio controller, wherein the packet loss threshold indicates a limit on dropped ZIGBEE packets for the active connection,
      determining that a duty cycle of the WLAN radio controller is greater than the packet loss threshold,
      setting the transmit power of the WLAN radio controller to a second transmit power value, wherein the second transmit power value is less than the first transmit power value,
      determining that a packet transfer rate associated with the WLAN radio controller is less than a minimum packet transfer rate for the functionality, and
      setting the transmit power of the WLAN radio controller to a third transmit power value, wherein the third transmit power value is greater than the second transmit power value.

2. The device of claim 1, further comprising:
   a first radio frequency coupler coupled to the first transmission line;
   a second radio frequency coupler coupled to the second transmission line; and
   a signal processor connected between the first radio frequency coupler and the second radio frequency coupler and wherein the signal processor is further configured to:
      receive a third radio frequency signal from the first radio frequency coupler, wherein the third radio frequency signal is a copy of the second radio frequency signal,
      set a magnitude and a phase of the third radio frequency signal to generate a fourth radio frequency signal, wherein the fourth radio frequency signal is configured to destructively interfere with a fifth radio frequency signal caused in the second transmission line by transmission of the second radio frequency signal using the first antenna, and
      transmit the fourth radio frequency signal to the second radio frequency coupler to cause the second radio frequency coupler to inject the fourth radio frequency signal into the second transmission line.

3. The device of claim 1, further comprising a programmable filter connected to the second transmission line and wherein the processor is further configured to execute instructions for:
   determining a frequency range associated with the WLAN channel; and
   configuring the programmable filter to remove a signal having a frequency within the frequency range from a sixth radio frequency passing through the programmable filter.

4. The device of claim 1, further comprising an impedance path between the ZIGBEE radio controller and the second antenna and connected to the second transmission line in parallel to the amplifier between the ZIGBEE radio controller and the second antenna, and wherein the ZIGBEE radio controller is configured to execute instructions for:
   determining that the WLAN radio controller is transmitting the second radio frequency signal;
   disconnecting, via a switch, the amplifier from the ZIGBEE radio controller; and
   connecting, via the switch, the ZIGBEE radio controller to the impedance path.

5. A device, comprising:
   a first controller;
   a second controller; and
   a processor that is configured to execute instructions for:
      determining that the first controller is transmitting a first radio frequency signal,
      setting a transmit power of the first controller to a first transmit power value,
      determining a duty cycle of the first controller is greater than a packet loss threshold associated with the second controller, wherein the packet loss threshold indicates a limit on dropped packets, and
      setting the transmit power of the first controller to a second transmit power value, wherein the second transmit power value is less than the first transmit power value.

6. The device of claim 5, wherein the second controller is configured to connect to an amplifier and the second controller is configured to execute instructions for:
   setting a receive gain of the amplifier to a first gain value;

receiving an indication from the first controller that the first controller is transmitting the first radio frequency signal; and setting the receive gain of the amplifier to a second gain value, wherein the second gain value is less than the first gain value.

7. The device of claim 6, further comprising an impedance path disposed between the second controller and an antenna and wherein the second controller is configured to execute instructions for:

disconnecting the amplifier from the second controller; and electrically coupling the second controller to the impedance path.

8. The device of claim 6, wherein before setting the receive gain of the amplifier to the second gain value, the second controller is further configured to execute instructions for, determining that a magnitude of a second radio frequency signal received by the second controller exceeds a maximum input signal magnitude of the amplifier.

9. The device of claim 5, further comprising:
a first transmission line coupled to the first controller;
a second transmission line coupled to the second controller;
a first radio frequency coupler coupled to the first transmission line;
a second radio frequency coupler coupled to the second transmission line; and
a signal processor connected to the first radio frequency coupler and the second radio frequency coupler.

10. The device of claim 9, wherein the signal processor is configured to execute the steps of:

receiving a third radio frequency signal from the first radio frequency coupler;

setting a magnitude and a phase of the third radio frequency signal to generate a fourth radio frequency signal, wherein the fourth radio frequency signal is configured to destructively interfere with a fifth radio frequency signal in the second transmission line caused by transmission of the first radio frequency signal; and transmitting the fourth radio frequency signal to the second radio frequency coupler.

11. The device of claim 5, further comprising a programmable filter connected to the second controller and wherein the processor is further configured to execute instructions for:

determining a frequency range allocated to the first controller; and configuring the programmable filter to filter a signal having a frequency that is within the frequency range.

12. The device of claim 5, wherein the processor is further configured to execute instructions for:

determining that a packet transfer rate associated with the first controller is less than a minimum packet transfer rate for a function being executed by the device; and setting the transmit power of the first controller to a third transmit power value, wherein the third transmit power value is greater than the second transmit power value.

13. A device, comprising:
a first controller connected to a first antenna; and
a second controller connected to a second antenna and to an amplifier, wherein the second controller is configured to execute instructions for:

setting a receive gain of the amplifier to a first gain value;

determining that the first controller is transmitting a second radio frequency signal using the first antenna; and setting, based on the determining, the receive gain of the amplifier to a second gain value, wherein the second gain value is less than the first gain value, wherein the amplifier is configured to change, based on the second gain value, a magnitude of a first radio frequency signal received from the second antenna.

14. The device of claim 13, further comprising an impedance path disposed between the second controller and the second antenna and wherein the second controller is configured to execute instructions for:

determining that the first controller is transmitting the second radio frequency signal;

disconnecting the amplifier from the second controller; and electrically coupling the second controller to the impedance path.

15. The device of claim 13, wherein before setting the receive gain of the amplifier to the second gain value, the second controller is further configured to execute instructions for determining that a magnitude of the first radio frequency signal exceeds a maximum input signal magnitude of the amplifier.

16. The device of claim 13, further comprising a processor that is configured to execute instructions for:

setting a transmit power of the first controller to a first transmit power value;

determining a duty cycle of the first controller is greater than a packet loss threshold associated with the second controller, wherein the packet loss threshold indicates a limit on dropped packets; and setting the transmit power of the first controller to a second transmit power value, wherein the second transmit power value is less than the first transmit power value.

17. The device of claim 16, wherein the processor is further configured to execute instructions for:

determining that a packet transfer rate associated with the first controller is less than a minimum packet transfer rate; and setting the transmit power of the first controller to a third transmit power value, wherein the third transmit power value is greater than the second transmit power value.

18. The device of claim 13, further comprising a processor configured to execute instructions for setting an attenuation level and a phase shift of a signal processor and the signal processor is configured to execute the steps of:

receiving a third radio frequency signal from a first transmission line;

modifying a magnitude and phase of the third radio frequency signal to generate a fourth radio frequency signal; and transmitting the fourth radio frequency signal to a second transmission line, wherein the fourth radio frequency signal is configured to destructively interfere with a fifth radio frequency signal in the second transmission line caused by transmission of the second radio frequency signal using the first antenna.

19. The device of claim 13, further comprising:
a programmable filter connected to the second controller; and
a processor configured to execute instructions for:
determining a frequency range allocated to the first controller; and configuring the programmable filter to remove a signal having a frequency that is within the frequency range from a sixth radio frequency signal passing through the programmable filter.

20. The device of claim 13, wherein the second controller is configured to execute additional instructions for receiving an input signal from the first controller, wherein the input signal indicates that the first controller is transmitting the second radio frequency signal.

* * * * *